United States Patent [19]

Rogers

[11] Patent Number: 5,016,269

[45] Date of Patent: May 14, 1991

[54] METHOD AND APPARATUS FOR UTILIZING A CELLULAR TELEPHONE IN A PROGRAMMABLE, INTELLIGENT EMERGENCY FREEWAY CALLBOX

[75] Inventor: Stephen W. Rogers, Irvine, Calif.

[73] Assignee: GTE Mobilnet, Incorporated, Houston, Tex.

[21] Appl. No.: 267,539

[22] Filed: Nov. 4, 1988

[51] Int. Cl.⁵ .............................................. H04Q 7/02
[52] U.S. Cl. ...................................... 379/59; 379/40; 379/51; 379/63
[58] Field of Search .................... 379/63, 59, 58, 60, 379/61, 38, 37, 40, 42, 43, 45, 49, 51; 455/33

[56] References Cited

U.S. PATENT DOCUMENTS

| | | | |
|---|---|---|---|
| 4,443,661 | 4/1984 | Kubo | 379/58 |
| 4,724,538 | 2/1988 | Farrell | 379/59 |
| 4,775,999 | 10/1988 | Williams | 379/59 |
| 4,788,711 | 11/1988 | Nasco, Jr. | 379/59 |
| 4,817,126 | 3/1989 | Hendershot | 379/58 |
| 4,817,190 | 3/1989 | Comroe et al. | 455/11 |
| 4,825,457 | 4/1989 | Lebowitz | 379/40 |

Primary Examiner—James L. Dwyer
Attorney, Agent, or Firm—Nilsson, Robbins, Dalgarn, Berliner, Carson & Wurst

[57] ABSTRACT

In an improved cellular telephone network, which in the illustrated embodiment, is a roadside emergency callbox system, and in which each cellular callbox includes programmable circuitry for call progress processing, various tones transmitted in a telephone exchange are detected, decoded and responsively acted upon by the callbox according to program control. Each callbox is further capable of receiving and decoding DTMF tones from the telephone exchange to allow arbitary information, including alphanumeric information for local display at the callbox, to be received and interactively processed subject to on-site program control. Still further, each of the callboxes within the cellular network can be remotely programmed by a maintenance computer to call a newly designated telephone number in the event of activation of the callbox which can be utilized in the case of the need for extraordinary emergency response. Each callbox senses a plurality of operational conditions and status alarms which are reported periodically or in real time according to remote program control, including the option of remotely masking any alarm or reporting protocol.

2 Claims, 12 Drawing Sheets

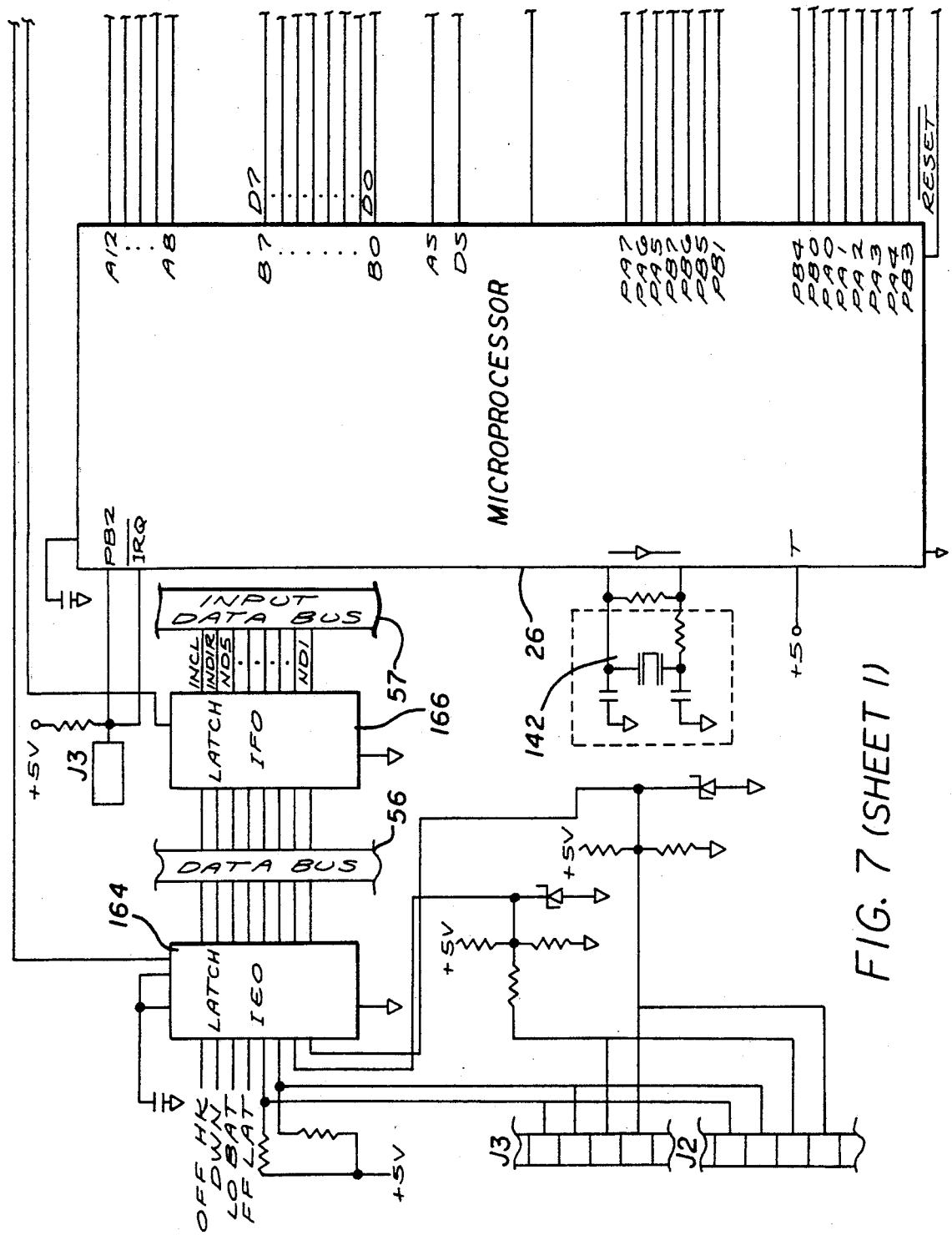
FIG. 7 (SHEET 1)

METHOD AND APPARATUS FOR UTILIZING A CELLULAR TELEPHONE IN A PROGRAMMABLE, INTELLIGENT EMERGENCY FREEWAY CALLBOX

BACKGROUND OF THE INVENTION

1. Field of the Invention

The invention relates to the field of roadside emergency telephones and in particular to a roadside telephone utilizing a cellular transceiver in combination with circuitry which allows remotely programmable reporting and operation.

2. Description of the Prior Art

Emergency roadside telephone systems are well known and are finding an expanding application not only to roadside situations, but to locations in recreational areas and remote areas which heretofore have not been feasible applications for public emergency telephone service. An example of a typical prior art emergency roadside telephone system is shown by Tuttle, et al, "Emergency Roadside Telephone System," U.S. Pat. No. 4,176,254 (1979).

One of the reasons for the expansion of the scope of the practical application for emergency telephone systems has been the utilization of cellular telephones in such systems, which allow the emergency telephone network to be installed and modified at a significantly smaller cost. Examples of prior usage of cellular transceivers and emergency telephone systems are shown in Farrell, "Emergency Roadside Telephone Communication System," U.S. Pat. No. 4,724,538 (1988) and in Nasco, Jr., "Apparatus and Method for Cellular Freeway Emergency Telephone Service," U.S. patent application Ser. No. 801,410, filed Nov. 25, 1985, now U.S. Pat. No. 4,788,711.

In such prior art units, such as the system described in Nasco, Jr., the cellular transceiver is controlled by one or more microprocessors which are in telephonic data communication with a central office or computer. This therefore allows for much more sophisticated operation of the callbox units including the sensing and reporting of physical communication status of each call box unit.

However, the design of such prior art units is capable of a limited degree of remote programmability, operational reporting and reconfiguration, and call processing, i.e. automatic processing and response to telephone network signals or rings.

Therefore, what is needed is a design for a cellular telephone system controlled by a software driven microprocessor in telephonic data communication with a remote office or computer having a variety of call processing, and remotely programmable preferential alarm processing features.

BRIEF SUMMARY OF THE INVENTION

The invention is a system for emergency callbox service comprising a plurality of emergency callboxes. Each callbox comprises a controller, a cellular transceiver coupled to the controller, a power circuit coupled to the controller for providing electrical power to the controller and for selectively providing electrical power to cellular transceiver. The controller comprises a circuit for call progress processing to respond to a plurality of communication conditions within the system, and a circuit for receiving and processing information to initiate operations in the controller. A cellular telecommunication subsystem is in selective radio telecommunication with each of the plurality of emergency callboxes. The cellular transceiver is remotely programmable. The controller programs the operations of the cellular transceiver in response to information received from the cellular telecommunication subsystem.

As a result, the plurality of emergency callboxes can be installed and maintained at low cost and are capable of arbitrarily programmable, interactive operation and response to the communications status of the cellular telecommunication subsystem.

The controller further comprises a circuit for remote programming of the controller from the cellular telecommunications subsystem for preferential alarm processing by the controller, and a circuit for generating a plurality of alarm signals. Each alarm signal is indicative of an operational status on the corresponding emergency callbox.

The circuit for call progress processing comprises a DTMF receiver circuit for decoding received DTMF signals from the cellular telecommunication subsystem into a digital format for programmable processing of information corresponding to the DTMF signals within the controller, and a call progress detector for decoding ring back, reorder and various burst signals received from the telecommunication subsystem indicative of communication status within the subsystem for further digital processing in the controller.

The circuit for receiving and processing information within the controller comprises a microprocessor and at least one memory coupled to the microprocessor. Throughout this specification "microprocessor" shall be taken to include an integrated circuit central processing unit, a microcomputer chip, embedded controller and the like. Thus, not only a cpu but input/output circuitry, memory and other circuit functions may be included on the "microprocessor" chip. The memory is characterized by a memory space. The circuit for receiving and processing information within the controller further comprises a circuit for selectively configuring the memory space addressable by the microprocessor. The circuit for configuring the memory space is adjustable to configure the memory space to accommodate a plurality of memory sizes for the memory.

The cellular telecommunications subsystem further comprises a remotely located central maintenance computer coupled through the cellular telecommunication subsystem with each of the plurality of emergency callbox. The emergency callbox is programmed to automatically report a plurality of operational status conditions of each corresponding callbox to the remote maintenance computer at a predetermined time and predetermined intervals.

Each of the plurality of callboxes has stored therein at least one telephone number which is automatically called upon activation of the callbox through the cellular telecommunication subsystem. The cellular telecommunications subsystem includes at least a second station having a different telephone number than that stored within the plurality of callboxes. The maintenance computer comprises a programming circuit for reprogramming each of the plurality of emergency callboxes during a selected time interval to each call a newly designated telephone number within the cellular telecommunication subsystem to provide for redirected emergency communications between the station responding to a newly programmed telephone number and the plurality of emergency callboxes.

In one embodiment each callbox comprises a display circuit coupled to the controller for providing an alphanumeric display visible at the callbox. Information displayed by the display circuit is determined at least in part by the controller and the controller is selectively responsive to information received from the cellular telecommunication subsystem with respect to information displayed by the display circuit.

The invention can also be characterized as an emergency roadside callbox comprising a controller circuit for receiving remotely originated information. The controller circuit comprises processing circuitry for uniquely identifying audio telecommunication signals for further processing. A cellular transceiver is coupled to and controlled by the controller and is remotely programmable through the controller. Operations of the cellular transceiver are interactively performed in response in part to remotely originated information received by the controller. A circuit for powering the controller is coupled to the controller and selectively powers the transceiver.

As a result, an emergency roadside callbox can be installed and maintained at low cost.

In another embodiment the invention is still further characterized as an emergency roadside callbox similar to that described above, but instead of, or in addition to, having processing circuitry for identifying audio telecommunication signals, has a circuit for sensing the status of a plurality of operational conditions of the emergency roadside callbox, and an alarm processing circuit for preferentially processing signals corresponding to the status of the operational conditions of the emergency roadside callbox.

The invention is still further characterized as a method utilized in an emergency roadside callbox. The callbox is coupled through a radio telecommunication link to a cellular telecommunication system and maintenance computer. The method comprising the steps of automatically reading a plurality of callbox status parameters at each one of a plurality of callboxes. The cellular telecommunication system is automatically called from the callbox to determine operational status and readiness of the telecommunication system for communication with the calling callbox. It is then determined whether the cellular telecommunication system is available for communication with the calling callbox. The steps of calling and determining whether the cellular telecommunication system is available are repeated, if the just previous step of determining indicates the cellular telecommunication system is not available for communication with the calling callbox. A predetermined telephone number is automatically called if the step of determining indicates the cellular telecommunication system is available for communication with the calling callbox. Information identifying the calling callbox is automatically sent, if the step of calling the number is successfully completed.

As a result, the callbox interactively responds to operational status of the cellular telecommunication system.

The steps of reading, calling, determining, repeating the steps of calling and determining, automatically calling a number, and automatically sending information are automatically initiated from the calling callbox without manual activation at the callbox.

The step of reading status of the operational parameters of the callbox comprises testing transmitter power output, testing receiver sensitivity, testing transmitter modulation, testing receiver audio output and testing status of alarms.

The steps of reading, calling, determining, repeating, automatically calling and automatically sending information from the callbox are initiated by manual activation of a switch at the callbox. The step of reading is at least partially inhibited to prevent interference with full duplex audio communication established through the cellular callbox.

The invention can also be characterized as a roadside emergency telephone system including a central office communicating with a telephone network comprising a mobile telephone switching office (MTSO) dedicated to a geographic service area divided into a plurality of cells. The office is connected to the telephone network by telephone link. A cell site controller is located within one of the cells and connected by data and voice communication channels to the MTSO. The cell site controller is provided for transmitting and receiving signals over the channels and for transmitting radio signal channels. A roadside station is located within the cell and is provided for selectively generating, in response to a manual input, radio request signals corresponding to an emergency telephone number and for exchanging radio human voice signals with the cell site controller. The roadside station comprises a circuit for interactively detecting and processing audio signals received form the telephone network through the mobile telephone switching office (MTSO) by the roadside station. The audio signals are indicative of communications status of the mobile telephone switching office (MTSO) and telephone network. The roadside station responsively undertakes a programmable, remedial response to the audio signals depending upon the significance of the audio signals. The cell site controller is further provided to translate the radio request signal from the roadside station into digital request signals for the mobile telephone switching office (MTSO). The mobile telephone switching office (MTSO) is provided to automatically dial a corresponding number in the telephone network in response to the digital request signals originating from the roadside station. The mobile telephone switching office (MTSO) is further provided to assign a voice channel for communication between the telephone network and roadside station. The cell site controller is further provided to receive data control messages from the mobile telephone switching office (MTSO) corresponding to the voice channel and to transmit data control messages with the voice radio messages to the roadside station.

The invention can better be visualized by turning to the following drawings where like elements are referenced by like numerals.

The invention and its various embodiments can best be understood by now turning to the following detailed description.

DETAILED DESCRIPTION OF THE PREFERRED EMBODIMENTS

In an improved cellular telephone network, which in the illustrated embodiment, is a roadside emergency callbox system, and in which each cellular callbox includes programmable circuitry for call progress processing, various tones transmitted in a telephone exchange are detected, decoded and responsively acted upon by the callbox according to program control.

Each callbox is further capable of receiving and decoding DTMF tones from the telephone exchange to allow arbitrary information, including alphanumeric information for local display at the callbox, to be received and interactively processed subject to on-site program control. Still further, each of the callboxes within the cellular network can be remotely programmed by a maintenance computer to call a newly designated telephone number in the event of activation of the callbox which can be utilized in the case of the need for extraordinary emergency response.

Each callbox senses a plurality of operational conditions and status alarms which are reported periodically or in real time according to remote program control, including the option of remotely masking any alarm or reporting protocol.

What is described as the illustrated embodiment is an improved cellular telephone callbox which may be used in emergency roadside applications. However, it must be expressly understood that the applications in which the callbox may be utilized may be any situation in which a caller would seek to communicate with a remotely located office for assistance, information or reporting.

First, the overall operation of the callbox and the utilization of information provided by the callbox to a central office will be generally described in terms of the functional tasks performed. Then, the circuit architecture and details of the circuitry will be described in turn by which the functions are implemented within the callbox.

Figure 1:
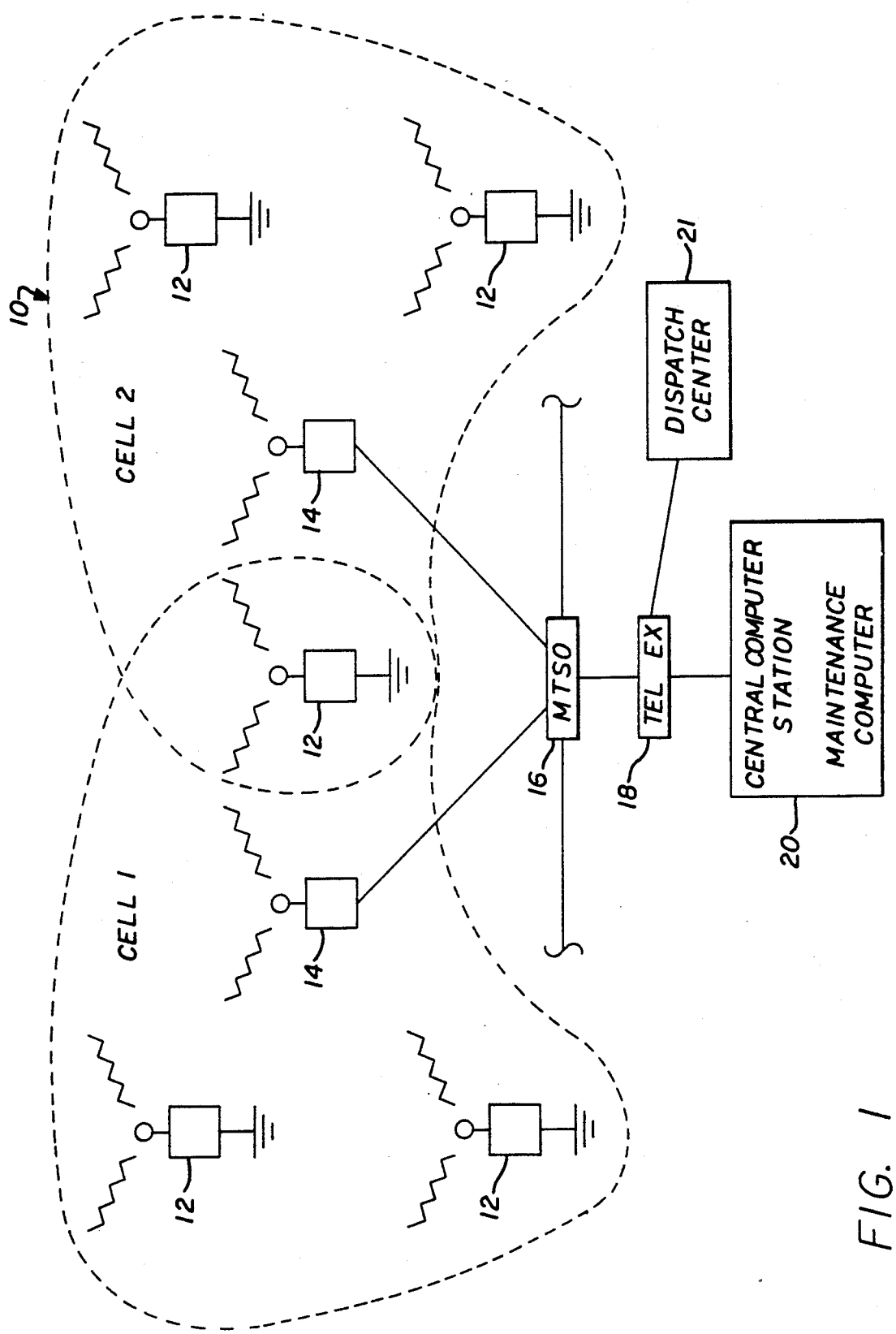
FIG. 1 is a diagrammatic depiction of a cellular network or system wherein callboxes of the invention are utilized.

FIG. 1 is a high diagrammatic depiction of a cellular system, generally denoted by reference numeral 10 having a plurality of cellular callboxes 12, each bidirectionally communicating with one or more cell site controllers 14 according to conventional cellular telephonic protocol.

The plurality of cell site controllers 14 in turn are coupled by land lines to a mobile telephone switching office (MTSO) 16 which administers the cellular network, again according to conventional cellular protocols. MTSO 16 is then coupled via land lines to a conventional telephone exchange 18 and then again through land lines to central computer station 20 or a dispatch center 21, which is thus coupled through cellular network 10 to the plurality of callboxes 12.

In addition to handling bidirectional voice traffic with each of the plurality of callboxes 12, central computer station 20 includes means, such as a central maintenance computer with sufficient memory and input and output devices to administer reporting, tracking and management of a plurality of operational signals from the network comprised of callboxes 12.

The administrative functions undertaken by central computer station 20 with respect to the network of callboxes 12 could be better understood by first considering the functions performed by each of callboxes 12.

Each callbox 12 is remotely programmably controlled to execute a report call function. Typically, each callbox is powered by a battery which may either be serviced by periodic replacement with recharged batteries or charged in situ by solar panels or land line power.

A first call report is executed by callbox 12 when it is first powered up, typically when the battery is connected. A second call report will then be made twelve (12) hours later. All subsequent call reports will be made D days apart, D, being a predetermined number between zero (0) and thirty two (32). The number of days between the report calls can be remotely programmed from central control station 20. In the event that no number is programmed into each callbox 12, a default value is taken between zero (0) and ten (10) which is stored within memory location 30 of the cellular transceiver within the callbox following the callbox number (ANI). ANI is an identification number which can be used either to designate a specific callbox to which it has been assigned, or to designate a specific location at which the callbox has been located.

Consider how a callbox is first synchronized with the maintenance computer when the callbox is initially installed. The given variables for any callbox are: its ANI, its identification number; the maximum ANI number; the reduced rate start time, i.e. the time of day when reporting is to occur, usually off-peak hours; the reduced rate end time; days between report calls; the calendar date; and the time of day of the programming of the callbox. Assume that there are 1000 callboxes which report between 12 am and 5 am. Call box #800 will thus report at 4 am. If it is now 4 pm, when callbox #800, for example, is programmed, the time period to the time of day when callbox #800 will report during the reduced rate interval is calculated. Callbox #800 is then programmed to report in 12 hours time. Callbox #800 can be remotely programmed with a selected personality at any prior to 4 am and preferably, prior to 12 am. The calendar date can be monitored so that the box reports not daily but on every other day or at some other diurnal variation.

Callbox 12 is capable of entering different modes of operation depending on what type of responsive signals it obtains from the telephone network. When making a preprogrammed report, callbox 12 will attempt to place the report through cellular network 10 to central computer station 20 a predetermined multiple of times, typically five (5) times. If a "no service" condition is encountered for any reason, such as by virtue of loss of the antenna at callbox 12, the callbox will hang up and will not try again until the next designated report day. If on the other hand, a callbox receives a line-busy, no-answer, in-use or drop-out signal on each of the five (5) consecutive attempts to complete a call, then callbox 12 will go off-line and attempt to remake the report call at a designated time later, such as four (4) hours.

Callbox 12 can operate differently according to remotely programmed alarm masks depending on its operational status. If there has been no power to callbox 12 for twenty four (24) hours supplied by its solar array or by a land line on the pole, callbox 12 will report a "no power on pole" condition, designated in the illustrated embodiment by status "3" on each subsequent report call until power has been restored. The power status is checked every twenty four (24) hours for a fifteen (15) second interval by the callbox.

Calls to different remotely programmed numbers can be selectively made from the callbox. In the illustrated embodiment, a key switch is provided with each callbox. Callbox 12 will call the number stored within memory location 1 of the transceiver when either there is no key in the key switch or the key is in the center position. If the key is turned one position clockwise and a call is initiated at the callbox, such as by lifting the hand set off the hook or pushing a button or switch, then callbox 12 will call the number stored within memory location 2 of the transceiver. Similarly, if the key switch is rotated to one position counter clockwise and a call is initiated at the callbox, callbox 12 will call the number located in memory location 3 of the transceiver. Likewise, the keyswitch may be substituted by a second button or manually activated switch of some type for use for nonemergency or informational services or communication originating from a separate dispatch center.

Whenever an alarm or status report call is made by callbox 12 pursuant to software control, callbox 12 will call the number located in memory location 9 of the transceiver. Thus, the actual emergency calls may be handled at a first number, such as the highway patrol or a central emergency office, while reporting of the operational aspects of the callbox or cellular telephone network 10 are made to a separate location, such as the local cellular network carrier.

As described in Nasco, Jr., when a person uses the callbox to make a roadside call for any purpose, callbox 12 will attempt to complete the call through cellular network 10 a predetermined multiple of times, for example five (5). If callbox 12 encounters a call noncompleted scenario, such as would occur if the cellular system were busy, the telephone central office circuit being busy or other call inhibiting situations, callbox 12 will hang up and try again up to a total of five (5) times. If the call can still not be completed after (5) attempts, callbox 12 hangs up and the call sequence must be reinitiated by the user at the call site, typically by hanging up and then relifting the hand set, by repushing the button or by reactivating a switch on the callbox at the site.

In the event that callbox 12 has lost or had its antenna functionally damaged and a call is attempted from the callbox, callbox 12 will detect the malfunction and power down after a predetermined time period, such as thirty (30) seconds.

Similarly, should callbox 12 be tilted by a predetermined amount, such as would occur if callbox 12 were struck, a tilt switch or other motion sensor within callbox 12 will initiate a tilt alarm. When a tilt condition occurs for a predetermined period, such as 3.5 seconds, then a tilt call is made from callbox 12 and an on-site audio alarm is strobed for approximately thirty (30) seconds. Only one tilt alarm is reported within a twenty four (24) hour interval by callbox 12 and the monitoring of tilt condition by the remote maintenance computer can be set to occur at some time period, such as twelve (12) hours after the callbox is initially powered up. A tilt alarm can then not be resent until the tilt condition returns to a normal status.

Similarly, whenever the callbox senses that the charged condition of the battery has reached a predetermined low level, when callbox 12 makes its preprogrammed report call, it will report a low battery status at that time and at all subsequent report calls until the condition is corrected.

Additionally, the time for which a call may be made from callbox 12 is programmably limited in order to conserve power. Unless a different time is programmed within callbox 12, callbox 12 will default to a call time of ten (10) minutes. If callbox 12 receives a DTMF tone of "1" from the highway patrol or from dispatch center 21, the call duration can be remotely increased to another time period such as twenty (20) minutes. Each callbox 12 will output its status and its callbox ANI number in DTMF codes, when requested during an answer interval by a maintenance computer at central computer station 20.

Communication from callboxes 12 to central computer station 20 is ultimately made through conventional land lines through telephone exchange 18 and hence are entirely analog. In the illustrated embodiment, status codes from callboxes 12 are made through DTMF tones. Each callbox 12 will output its status and its callbox ANI number in DTMF codes, when requested with a DTMF number by a maintenance computer at central computer station 20.

All status conditions are reported each time a callbox calls in. A callbox may report to the maintenance computer during a normal maintenance or diagnostic call, or on an alarm call. The error or status conditions reported as they occur are marked in Table A below by an asterik, otherwise the error or status condition will be transmitted to the maintenance computer on the next scheduled report call.

TABLE A

|  | MAINTENANCE Diagnostic Calls | |
|---|---|---|
|  | ALARM | REPORT |
| Road Call |  |  |
| Report Call |  | * |
| Battery & Solar | * | R |
| Tilt | * | R |
| Hand Set | * | R |
| Authorized Entry | R | R |
| Outer Door | R | R |
| Light Burn Out | R | R |
| Celluar Error | R | R |
| Controllar Bit | R | R |
| Inner Door | * | * |

* When the error or condition is first encountered the Call Box will report the condition to the maintenance control center.
R Status of the given test is indicated when a check-in call is placed.

The error and status conditions are reported in the form of a status word comprised of four eight bit bytes, (S)-S3 given by the coding below in Table B. After the four status bytes, S0–S3, a four byte ANI is sent followed by a mod 10 check sum for the entire status data string.

TABLE B
STATUS DATA SENT FROM CALL BOX

```
| S0  S1  S2  S3 |  _   _   _   _  | MOD 10 CHECK SUM
     STATUS              ANI
```

| STATUS | S0 | | | | S1 | | S2 | | | S3 | | |
|---|---|---|---|---|---|---|---|---|---|---|---|---|
| | AUTHORIZED ENTRY | CELLULAR ERROR | REPORT CALL | PROGRAM CALL | OUTER DOOR | BATTERY | HAND SET | TILT | SOLAR | LIGHT BURN OUT | CONTROLLER BIT | INNER DOOR |
| 0 | | | | | | | | | | | | |
| 1 | | | X | | | | X | | X | | | X |
| 2 | | X | | | X | | X | | | | X | |
| 3 | | X | X | | X | X | X | X | | | X | X |
| 4 | X | | | X | | | X | | | X | | X |
| 5 | X | | X | X | | X | X | | X | X | | |
| 6 | X | X | | X | X | | X | X | | X | X | |
| 7 | X | X | X | X | X | X | X | X | X | X | X | X |

Figure   Callbox Automatic Status Report

The callbox ANI is field programmable and stored in memory location 30 of the cellular transceiver at the callbox. If no number is stored in location 30 then callbox 12 will call in with an ANI of 00. The ANI is programmed in the callbox in the field by opening the callbox and connecting a conventional cellular handset into the transceiver within the callbox. The circuitry in the callbox is powered up by pushing a button on the front of the callbox or activating the hook switch. The callbox is opened, a handset connected to an input jack provided for field service and instructions entered from the key pad of a handset. In the illustrated embodiment the instruction entered through the handset which stores the ANI in the callbox is "CLR*NNNNDASTR 30" where CLR=display,
*=callbox,
NNNN=callbox number, e.g. 0000–9999,
D=days between report calls, 0–9,
A=characterization of the system, (1) a non-wireline carrier, (2) a wireline carrier,
STR=store, and
30=store callbox number in memory location 30 of the callbox transceiver.

Thus, instruction CLR 0050 5 1 STR 30 stores in memory location 30 of the transceiver the number 50 uniquely associated with the callbox and instructs the callbox to report every fifth day and informs it that it is calling on a non-wireline carrier.

The basic functions of each callbox 12, now having been described, consider how the information reports from the network of callboxes 12 shown in FIG. 1 are utilized within a maintenance computer. The maintenance computer possibly located within central station 20 collects the information from network 10 of callboxes 12 and displays the information together with added information drawn from memory within station 20 to produce a variety of report summaries. One such summary is depicted below in Table 1 such as would be seen with respect to the last callbox 12 of network 10 to have called the maintenance computer.

TABLE 1

```
                    COMARCO INC. CALL BOX
12:09:33     MAINTENANCE REPORTING SYSTEM
                       VERSION: 1.24

DATE OF LAST CALL: 10-30-1987     TIME OF LAST CALL: 17:10:26
SIGN NUMBER: 605-0001             ANI: 0001              REV: 1
PHYSICAL LOCATION: JUST SOUTH OF THE GUARDRAIL WHICH ENDS ON E/B I5
MAP LOCATION: 123A-C6                              PERSONALITY: 1
                      CALLBOX DIAGNOSTICS
          SOLAR PANEL       PASS      BATTERY       PASS
          TILT              PASS      LAMP          PASS
          HANDSET           PASS      INNER DOOR    PASS
          CONTROLLER BITE   PASS      OUTER DOOR    PASS

WAITING FOR CALL
```

The time and date of the last call received by the maintenance computer is listed together with the ANI of the calling callbox, the identifying numbers on the sign on the callbox at the location, a physical description of the location of the callbox, a cross reference to a map book, and a designation of one of a plurality of predetermined operational configurations possible for the callbox which is designated as its personality. The operational personality of the callbox can be remotely programmed to assume one of the predetermined configurations or can be customized for each callbox. Below the particulars identifying the nature of the callbox is a listing of callbox operational diagnostics indicating whether that particular function of the callbox has passed or failed.

In addition to these functions, each callbox is able to test whether the handset is in place or not, should it have a handset (as opposed to being a hands free model); whether the controller byte is acceptable;

whether the lamp, if one is provided, at the callbox is operable; whether the outer door of the callbox, which is normally spring loaded shut, is in place; and whether the inner door panel, which provides access from maintenance personnel to the circuitry within the callbox is secure or has been violated.

In addition to a callbox identification as depicted in Table 1, the historical data reporting from each callbox 12 of network 10 can similarly be summarized in the maintenance computer such as depicted in Table 2 below.

TABLE 2

| VIEW/ALTER PARAMETERS FOR CALLBOX 123 | | | |
|---|---|---|---|
| Date of Last Call: | 11-05-1987 | Time of Last Call: | 10:46:48 |
| Date Last Alarm: | 10-30-1987 | Time Last Alarm: | 23:44:06 |
| Date Alarms Reset: | 10-30-1987 | Time of Report Call: | 00:44:17 |
| Date Last Programmed: | 11-05-1987 | Version Number: | 31 |
| Last Alarm Status: | 1001H | Personality Old: | 2 |
| (1) Short Description: ENGINEERING TEST TRANSCEIVER | | | |
| (2) Freeway Sign Number: | 605-0123 | (3) Days Between Calls: | 2 |
| (4) Last Check-in Status: | 401H | (5) Map Locator: | 123A-C6 |
| Old Check-in Status: | 401H | (6) Box in Service: | 1 |
| (7) Expansion #1 Count: | 0 | (8) Backbone Error Count: | 1 |
| (9) Report Call Count: | 1 | (10) Program Count: | 2 |
| (11) Outer Door Count: | 2 | (12) Battery Fail Count: | 0 |
| (13) Handset Fail Count: | 0 | (14) Tilt Switch Count: | 0 |
| (15) Solar Panel Count: | 1 | (16) Lamp Fail Count: | 4 |
| (17) BITE Fail Count: | 0 | (18) Inner Door Count: | 2 |
| (19) Officers Beat: | CAR54 | (20) Personality New: | 2 |
| (21) Date of Report Call: | 11-03-1987 | (22) Reset All Counters | |
| INPUT FIELD TO ALTER (1-22) ENTER '0' IF ALL FIELDS ARE CORRECT ? | | | |

Thus, the number of times when an alarm or status condition has been reported over a designated reporting period can be summarized together with coding for present and historical check of the status conditions.

Similarly, global variables in network 10 of callboxes 12 can be manipulated my macro-instructions through menu commands such as illustrated in Table 3 below, e.g. the hour reporting time of callboxes 12 can be manipulated.

TABLE 3

| GLOBAL VARIABLES | |
|---|---|
| PLEASE ENTER THE NUMBER OF THE PARAMETER YOU WANT TO CHANGE | |
| (1) REDUCED RATE START TIME (00-24) | 0 |
| (2) REDUCED RATE END TIME (00-24) | 6 |
| (3) TOTAL NUMBER OF CALLBOXES | 1000 |
| (4) AUTOMATIC PRINTING OF QUEUED REPORTS | YES |
| (5) REPORT CALLS PRINTED | YES |
| ENTER A ZERO WHEN DONE? | |

In the example of Table 3, 1,000 callboxes will report between midnight and six a.m. at 1,000 equally spaced time intervals. This can be programmably altered through manipulation of the menu depicted in Table 3.

Each callbox is programmable with one of a plurality of set operational configurations or may be arbitrarily customized from central computer station 20. For example in Table 4 below is a menu which appears at a control monitor at the central computer station 20 which relates, for example, to personality type Sybil 2.

TABLE 4

| PERSONALITY SYBIL 2 | |
|---|---|
| PLEASE ENTER THE NUMBER OF THE PARAMETER YOU WISH TO CHANGE | |
| (1) PERSONALITY NUMBER | 2 |
| (2) INTERVAL BETWEEN REPORTS (IN DAYS) | 2 |

TABLE 4-continued

| PERSONALITY SYBIL 2 | |
|---|---|
| (3) TIME BETWEEN RETRIES (MIN) | 240 |
| (4) ROAD CALL RING COUNT | 10 |
| (5) CALL BACK TIME (MIN) | 45 |
| (6) MAINTENANCE ALARM MASK | |
| (7) CHP ALARM MASK | |
| ENTER A ZERO WHEN DONE? | |

TABLE 5

| PERSONALITY SYBIL 2 | | |
|---|---|---|
| ENTER THE ALARM YOU WISH TO CHANGE MAINTENANCE CENTER CHECK-IN? | | |
| (1) | HANDSET MICROPHONE | ON |
| (2) | HANDSET EARPIECE | ON |
| (3) | INNER DOOR SWITCH | ON |
| (4) | SOLAR PANEL DETECTOR | OFF |
| (5) | LOW BATTERY | OFF |
| (6) | TILT SWITCH | ON |
| (7) | LAMP DETECTOR | ON |
| (8) | REPORT CALL | ON |
| (9) | OUTER DOOR OPEN | OFF |
| ENTER A ZERO WHEN DONE? | | |

An "on" indication in the maintenance alarm mask indicates which alarms cause an immediate call to be made to the maintenance computer of central computer station 20 from callbox 12. In personality, Sybil 2, alarms relating to malfunctions of the handset, ear piece or microphone, inner door switch, tilt switch, lamp detector and report call are each turned on while the remaining alarms to the solar panel detector, low battery and outer door open are off. Even though an alarm is masked off, its status is nevertheless reported on the next regularly scheduled alarm or report call although no immediate call in is made when the condition is sensed.

Table 6 below indicates the menu relating to the highway patrol alarm masks.

TABLE 6

| PERSONALITY SYBIL 2 | | |
|---|---|---|
| ENTER THE ALARM YOU WISH TO CHANGE CHP ALARM CHECK-IN? | | |
| (1) | HANDSET MICROPHONE | OFF |
| (2) | HANDSET EARPIECE | OFF |
| (3) | INNER DOOR SWITCH | OFF |
| (4) | SOLAR PANEL DETECTOR | OFF |
| (5) | LOW BATTERY | OFF |
| (6) | TILT SWITCH | OFF |
| (7) | LAMP DETECTOR | OFF |

TABLE 6-continued

| | PERSONALITY SYBIL 2 | |
|---|---|---|
| (8) | REPORT CALL ENTER A ZERO WHEN DONE? | OFF |

Again, the masking function is very similar to that of maintenance control with the exception that when a highway patrol alarm is called a different number is called from the memory of the transceiver and therefore different status signals may be communicated to the called station. In the case of the highway alarm control in personality Sybil 2, none of the status signals are communicated to the highway department, which in the illustrated embodiment would normally have no responsibility for maintenance of network 10.

Table 7 below indicates a report which can be printed out based upon a daily automatic report from network 10.

TABLE 7

| REPORT QUEUE |
|---|
| (1) exception (2) ALARM (3) maintenance (4) not used (5) all |
| (9) RUN MARKED REPOR |

| (10) | 0 11-09-1987 | (26) | 0 10-24-1987 | (42) | 0 10-08-1987 | (58) | 0 09-22-1987 |
|---|---|---|---|---|---|---|---|
| (11) | 1 11-08-1987 | (27) | 0 10-23-1987 | (43) | 0 10-07-1987 | (59) | 0 09-21-1987 |
| (12) | 0 11-07-1987 | (28) | 0 10-22-1987 | (44) | 0 10-06-1987 | (60) | 0 09-20-1987 |
| (13) | 0 11-06-1987 | (29) | 0 10-21-1987 | (45) | 0 10-05-1987 | (61) | 0 09-19-1987 |
| (14) | 0 11-05-1987 | (30) | 0 10-20-1987 | (46) | 0 10-04-1987 | (62) | 0 09-18-1987 |
| (15) | 0 11-04-1987 | (31) | 0 10-19-1987 | (47) | 0 10-03-1987 | (63) | 0 09-17-1987 |
| (16) | 7 11-03-1987 | (32) | 0 10-18-1987 | (48) | 0 10-02-1987 | (64) | 0 09-16-1987 |
| (17) | 0 11-02-1987 | (33) | 0 10-17-1987 | (49) | 0 10-01-1987 | (65) | 0 09-15-1987 |
| (18) | 0 11-01-1987 | (34) | 0 10-16-1987 | (50) | 0 09-30-1987 | (66) | 0 09-14-1987 |
| (19) | 0 10-31-1987 | (35) | 0 10-15-1987 | (51) | 0 09-29-1987 | (67) | 0 09-13-1987 |
| (20) | 4 10-30-1987 | (36) | 0 10-14-1987 | (52) | 0 09-28-1987 | (68) | 0 09-12-1987 |
| (21) | 0 10-29-1987 | (37) | 0 10-13-1987 | (53) | 0 09-27-1987 | (69) | 0 09-11-1987 |
| (22) | 0 10-28-1987 | (38) | 0 10-12-1987 | (54) | 0 09-26-1987 | (70) | 2 09-10-1987 |
| (23) | 0 10-27-1987 | (39) | 0 10-11-1987 | (55) | 0 09-25-1987 | (71) | 0 09-09-1987 |
| (24) | 0 10-26-1987 | (40) | 0 10-10-1987 | (56) | 0 09-24-1987 | (72) | 0 09-08-1987 |
| (25) | 0 10-25-1987 | (41) | 0 10-09-1987 | (57) | 0 09-23-1987 | (73) | 0 09-07-1987 |
| | INPUT 1 TO 73 OR 0 TO END ? | | | | | | |

The number in the parenthesis is the ANI number of the callbox followed by the number of reports made by that callbox and the date of the last such report. Reports are available for both the exceptional or immediate call routine, and for the alarm routine or maintenance routine. Reports may be all simultaneously run or certain marked reports may be run. For example, the print out represents the alarm report of callbox with ANI 10 indicates no alarms have been sent as of the last report date of Nov. 9, 1987.

Customized historical reports may be generated which allows the user at central computer station 20 to produce a tailored report. Table 8 below indicates the menu which could be utilized to produce a historical report such as shown in Table 9.

TABLE 8

| (0) | EXIT | |
|---|---|---|
| (1) | STARTING CALLBOX ANI | 1 |
| (2) | ENDING CALLBOX ANI | 222 |
| (3) | START DATE MM-DD-19YY | 11-01-1987 |
| (4) | END DATE MM-DD-19YY | 11-04-1987 |
| (5) | SEND REPORT TO SCREEN OR PRINTER | PRINTER |
| (6) | STATUS C R P O B H T S U I OR ALL | ALL |
| (7) | STATUS EVALUATION AND/OR ALL | ALL |
| (8) | SORT REPORT BY ANI | YES |
| (9) | RUN REPORT | |
| | INPUT 0 TO 9 | |

TABLE 9

COMARCO
HISTORICAL REPORT

| | |
|---|---|
| STARTING CALL BOX ANI | 1 |
| ENDING CALL BOX ANI | 223 |
| START DATE | 11-01-1987 |
| END DATE | 11-04-1987 |
| STATUS C R P O B H T S L U I OR ALL | ALL |
| STATUS EVALUATION AND , OR , ALL | ALL |
| REPORT CALL START TIME | 0:00 |
| REPORT CALL END TIME | 6:00 |
| MAX ANI | 1000 |

| BOX ANI | SIGN NUMBER | MAP LOCATION | SYBIL # | PHYSICAL LOCATION |
|---|---|---|---|---|
| 71 | 605-0071 | 123A-C6 | 2 | ON THE POLE IN FRONT OF COMARCO'S LOBBY |
| 101 | 605-0101 | 123A-C6 | 1 | 405 SOUTHBOUND @ YALE AVE. OVERCROSSING |
| 102 | 605-0102 | 123A-C6 | 2 | 405 NORTHBOUND @ YALE AVE. OVERCROSSING |
| 123 | 605-0123 | 123A-C6 | 1 | ENGINEERING TEST TRANSCEIVER |
| 184 | 605-0184 | 123A-C6 | 1 | SOMEWHERE ON 5 FWY. IN L.A. |
| 186 | 605-0186 | 123A-C6 | 1 | SOMEWHERE ELSE ON 5 FWY. IN L.A. |
| 188 | 605-0188 | 123A-C6 | 1 | YET ANOTHER CALLBOX ON 5 FWY. SOMEWHERE IN L.A. |
| 222 | 605-0222 | 123A-C6 | 9 | JUST SOUTH OF THE GUARDRAIL WHICH ENDS ON E/B 1 |

CALL BOX PERSONALITY NUMBER SYBIL 1

| | | | |
|---|---|---|---|
| RING COUNT: | 10 | HOLD TIME MIN: | 45 |
| CHP MASK 1: | 0 | CHP MASK 2: | 0 |
| REPORT MASK 1: | 71 | REPORT MASK 2: | 1 |
| DAYS BETWEEN REPORT CALLS: | | MIN BETWEEN RETRIES: | 240 |

CALL BOX PERSONALITY NUMBER SYBIL 2

| | | | |
|---|---|---|---|
| RING COUNT: | 10 | HOLD TIME MIN: | 45 |
| CHP MASK 1: | 0 | CHP MASK 2: | 0 |
| REPORT MASK 1: | 199 | REPORT MASK 2: | 1 |
| DAYS BETWEEN REPORT CALLS: | 2 | MIN BETWEEN RETRIES: | 240 |

CALL BOX PERSONALITY NUMBER SYBIL 9

| | | | |
|---|---|---|---|
| RING COUNT: | 10 | HOLD TIME MIN: | 45 |
| CHP MASK 1: | 0 | CHP MASK 2: | 0 |
| REPORT MASK 1: | 71 | REPORT MASK 2: | 1 |
| DAYS BETWEEN REPORT CALLS: | 1 | MIN BETWEEN RETRIES: | 240 |

| DATE | TIME | SIGN NUMBER | ANI | CLLERR | REPORT | PROGRAM | OUTRDR | BATTRY | HANDST | TILT | SOLAR | LAMP | BITE | INDOOR |
|---|---|---|---|---|---|---|---|---|---|---|---|---|---|---|
| 11-01-1987 | 23:27:56 | 605-0071 | 0071 | | R | | | | | | | | | |
| 11-02-1987 | 23:27:42 | 605-0071 | 0071 | | R | | | | | | | | | |
| 11-03-1987 | 23:27:33 | 605-0071 | 0071 | | R | | | | | | | | | |
| 11-04-1987 | 23:26:51 | 605-0071 | 0071 | | R | | | | | | | | | |
| 11-02-1987 | 21:56:13 | 605-0101 | 0101 | | | | | B | | | | | | I |
| 11-03-1987 | 16:20:20 | 605-0101 | 0101 | | | | | | | | | | | I |
| 11-03-1987 | 16:21:27 | 605-0101 | 0101 | | | | | | | | | | | I |
| 11-03-1987 | 16:25:51 | 605-0101 | 0101 | | | | | B | | | S | | | |
| 11-04-1987 | 16:28:34 | 605-0101 | 0101 | | | | | | | | | L | | I |
| 11-04-1987 | 00:35:12 | 605-0102 | 0102 | | | | | B | | | | | | I |
| 11-02-1987 | 15:39:14 | 605-0102 | 0102 | | | | | | | | | | | |
| 11-02-1987 | 15:40:19 | 605-0102 | 0102 | | | | | | | | | | | |

TABLE 9-continued
COMARCO
HISTORICAL REPORT

| Date | Time | Col1 | Col2 | Col3 | Col4 | Col5 | Col6 | Col7 | Col8 | Col9 | Col10 |
|---|---|---|---|---|---|---|---|---|---|---|---|
| 11-03-1987 | 16:44:43 | 605-0102 | 0102 | | | | | | | | |
| 11-01-1987 | 23:43:45 | 605-0123 | 0123 | | R | | | | | | I |
| 11-02-1987 | 23:43:13 | 605-0123 | 0123 | | R | | | | | | I |
| 11-03-1987 | 23:42:38 | 605-0123 | 0123 | | R | | | | | | I |
| 11-04-1987 | 10:29:40 | 605-0123 | 0123 | | | | | | | | I |
| 11-04-1987 | 10:45:15 | 605-0123 | 0123 | C | | | | | | | I |
| 11-04-1987 | 10:47:38 | 605-0123 | 0123 | | | | | | | | I |
| 11-04-1987 | 10:51:04 | 605-0123 | 0123 | | | O | | | | | I |
| 11-04-1987 | 11:00:06 | 605-0123 | 0123 | | | | | | | | I |
| 11-04-1987 | 11:01:42 | 605-0123 | 0123 | | | O | | | | | I |
| 11-04-1987 | 11:05:27 | 605-0123 | 0123 | | | | | | | | I |
| 11-04-1987 | 11:07:23 | 605-0123 | 0123 | | | | | | | L | I |
| 11-04-1987 | 11:47:33 | 605-0123 | 0123 | | | | | | | | I |
| 11-04-1987 | 11:50:41 | 605-0123 | 0123 | | | | | | | | I |
| 11-04-1987 | 11:58:08 | 605-0123 | 0123 | | | | | | | L | I |
| 11-04-1987 | 12:00:40 | 605-0123 | 0123 | | | | | | | L | I |
| 11-04-1987 | 12:08:44 | 605-0123 | 0123 | | | | | | | | I |
| 11-04-1987 | 14:26:41 | 605-0123 | 0123 | | | | | | | | I |
| 11-04-1987 | 14:30:17 | 605-0123 | 0123 | | | | | | S | | I |
| 11-04-1987 | 16:23:15 | 605-0123 | 0123 | | | P | | | | | I |
| 11-04-1987 | 17:06:55 | 605-0123 | 0123 | | | | | | | | I |
| 11-01-1987 | 23:39:13 | 605-0184 | 0184 | | R | O | H | | S | L | I |
| 11-02-1987 | 23:38:33 | 605-0184 | 0184 | | R | O | H | | S | L | I |
| 11-03-1987 | 23:37:51 | 605-0184 | 0184 | | R | O | H | | S | L | I |
| 11-04-1987 | 23:36:44 | 605-0184 | 0184 | | R | O | H | | S | L | I |
| 11-01-1987 | 05:12:01 | 605-0186 | 0186 | | R | O | H | | S | L | I |
| 11-02-1987 | 05:15:17 | 605-0186 | 0186 | | R | O | H | T | S | L | I |
| 11-03-1987 | 05:18:09 | 605-0186 | 0186 | | R | O | H | T | S | L | I |
| 11-04-1987 | 05:20:59 | 605-0186 | 0186 | | R | O | H | | S | L | I |
| 11-01-1987 | 00:34:25 | 605-0188 | 0188 | | R | O | H | | S | L | I |
| 11-02-1987 | 00:34:35 | 605-0188 | 0188 | | R | O | H | | S | L | I |
| 11-03-1987 | 00:34:26 | 605-0188 | 0188 | | R | | H | | S | L | I |
| 11-04-1987 | 00:34:18 | 605-0188 | 0188 | | R | O | H | | S | L | I |
| 11-01-1987 | 01:19:22 | 605-0222 | 0222 | | R | | | | S | L | I |

Here certain designated callboxes, ANI 1-223 are checked over a predetermined time period Nov. 1 through Nov. 4, 1987, with a status evaluation made of all parameters for report calls received between midnight and six a.m.. The boxes are first identified together with a summary of the personality types of the boxes which are displayed. Thereafter, the historical report of the status of each of the boxes is itemized and reported on a chronological basis for each callbox. For example callbox ANI 71 is shown as having made one report for each of the four days of operation. An emergency call was made on box ANI 123 on November 4, at 10:45 a.m.. The operational history of each callbox over time and date is thus graphically reported according to the status flags.

Table 10 below shows yet another screen which can be utilized on the maintenance computer in central station 20.

TABLE 10

| PLEASE ENTER THE PASSWORD TO CHANGE PHONE NUMBERS ? |
|---|
| ANSWER POSITION PHONE NUMBERS |
| (0) 283-1904 |
| (1) 283-1904 |
| (2) 921-2240 |
| (3) 283-1904 |
| (4) 921-2240 |
| (5) 283-1904 |
| (6) 283-1904 |
| (7) 283-1904 |
| (8) 283-1904 |
| (9) 283-1904 |
| PLEASE INPUT THE NUMBER TO BE PROGRAMMED ? |

This screen displays phone number options for the purposes of reprogramming the answer-position phone in a particular callbox, namely the phone number which the callbox will ring when the user at the callbox site lifts the hook switch or pushes the call button. The number selected from this menu will then be automatically stored in memory location 1 of the transceiver in the identified callbox or boxes.

Similarly, in Table 11 below is a similar menu by which the maintenance center phone numbers can be altered and stored within memory location 9 of the transceiver of any particular callbox.

TABLE 11

| PLEASE ENTER THE PASSWORD TO CHANGE PHONE NUMBERS ? |
|---|
| MAINTENANCE CENTER PHONE NUMBERS |
| (0) 921-2240 |
| (1) 921-2240 |
| (2) 921-2240 |
| (3) 921-2240 |
| (4) 921-2240 |
| (5) 921-2240 |
| (6) 921-2240 |
| (7) 921-2240 |
| (8) 921-2240 |
| (9) 921-2240 |
| PLEASE INPUT THE NUMBER TO BE PROGRAMMED ? |

Table 12 is a similar menu in which the numbers of the appropriate emergency assistance or highway patrol can similarly be automatically loaded into the callbox in memory location 8 of the transceiver.

TABLE 12

| PLEASE ENTER THE PASSWORD TO CHANGE PHONE NUMBERS ? |
|---|
| CHP ALARM CENTER PHONES PHONE NUMBERS |
| (0) 283-1904 |

TABLE 12-continued

| (1) 283-1904 |
|---|
| (2) 283-1904 |
| (3) 283-1904 |
| (4) 283-1904 |
| (5) 283-1904 |
| (6) 283-1904 |
| (7) 283-1904 |
| (8) 283-1904 |
| (9) 283-1904 |
| PLEASE INPUT THE NUMBER TO BE PROGRAMMED ? |

Table 13 allows the user at central computer station 20 to interrogate any specific callbox by its ANI and obtain a reading of the phone numbers stored within each of the memory slots in the transceiver at the selected callbox. Although not shown here, statistical surveys or summaries of the system callbox performance can also be generated showing average number of calls, average time of calls, and like including standard deviations of each parameter from its average and other statiscal measures.

TABLE 13

| PRESS "C" TO CLEAR THE PROGRAM PHONE NUMBER FLAG OR "E" TO EXIT ? | |
|---|---|
| NUMBERS CURRENTLY IN CALLBOX 123 MEMORY | |
| MEMORY SLOT 01: | 283-1904 |
| MEMORY SLOT 02: | 283-1904 |
| MEMORY SLOT 03: | 283-1904 |
| MEMORY SLOT 04: | 283-1904 |
| MEMORY SLOT 05: | 283-1904 |
| MEMORY SLOT 08: | 283-1904 |
| MEMORY SLOT 09: | 921-2240 |
| MEMORY SLOT 30: | 01231# |
| PHONE FLAGS CURRENTLY: | 000 |
| PRESS ANY KEY TO EXIT ? | |

Figure 2:
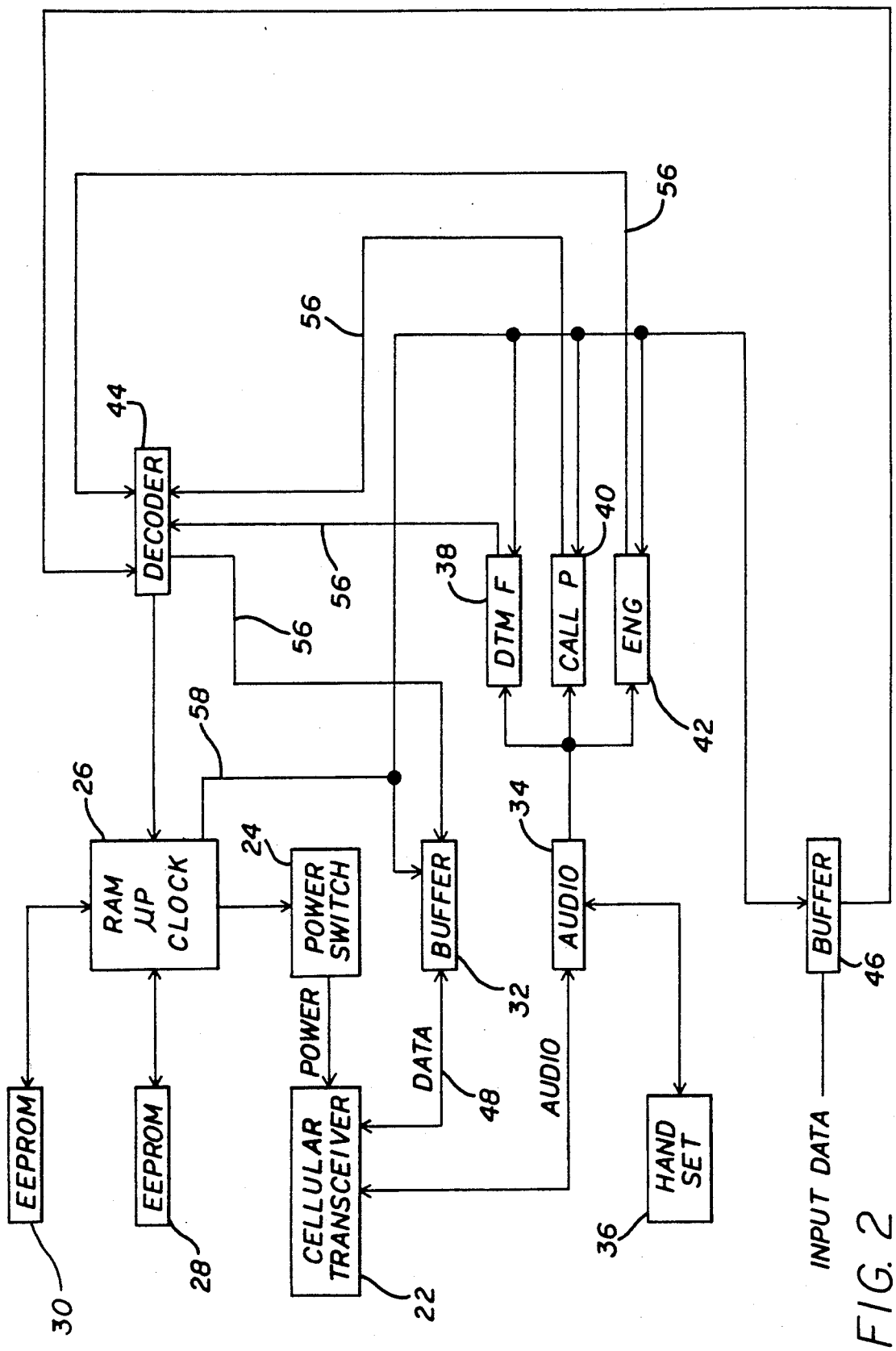
FIG. 2 is a simplified block diagram of the callbox circuitry shown and described in FIGS. 3–8.

The functions of each callbox within the network 10 now having been described and the utility of the programmable reporting of multiple status signals for the operation and maintenance of such network having been illustrated by the Tables above, turn now to the circuitry in which the operation is implemented. FIG. 2 is a simplified block diagram of the circuitry within each callbox 12. A cellular transceiver 22 is selectively provided power through a power switch 24 controlled by a microprocessor 26. Microprocessor 26 includes an onboard clock and RAM for executing program functions as described above. Additional memory is provided through EPROMs 28, which in the illustrated embodiment need only be between 2K to 8K capacity. Still further memory is available through EEPROM 30 to allow for the saving of data and status conditions or programming of personality when power is removed from the callbox.

Audio signals are bidirectionally communicated from transceiver 22 to audio buffer 34. Audio buffer 34 is also bidirectionally communicated to handset 36 which can symbolically be read to include a speaker and a microphone in a hands free unit. The output of audio buffer 34 in turn is provided to the input of a DTMF processor 38, a call processor 40, and an engagement or a peak to peak detector 42. The outputs of DTMF processor 38, call processor 40 and peak to peak detector 42 are in turn each coupled to inputs of a microprocessor 26. Decoder 44 provides appropriate memory mapping for microprocessor 26 and data buffer 32. Command signals are then provided by microprocessor 26 to buffer 32 whose output is connected to cellular transceiver 22 for providing digital information and other command signals to the cellular transceiver, as appropriate.

An input buffer 46 is coupled to a plurality of callbox sensing circuits which similarly relays these signals to an input of decoder 44. Buffer 46 thus will provide various signals relating to the status of the inner door, outer door, battery, tilt switch, push button or switch hook, speaker phone, microphone, lamp and so forth as discussed above.

The overall circuit architecture of callbox 12 having been diagrammatically depicted in FIG. 2, consider now the detailed implementation of each portion of the circuitry of FIG. 2 as discussed in connection with FIGS. 3–7 below. Consider first cellular transceiver 22 which in the illustrated embodiment is a model 4000 X. Table 14 below lists the data bus assignments for transceiver 22 which appear on a 5 bit data bus 48 in FIG. 2.

TABLE 14

DATA BUS ASSIGNMENTS
CU → TU

| CU STATE | DATA BUS+ | | | | |
|---|---|---|---|---|---|
| | 5 | 4 | 3 | 2 | 1 |
| NO USER OPERATION | 1 | 1 | 1 | 1 | 1 |
| 1 KEY DEPRESSED | 1 | 1 | 1 | 1 | 0 |
| 2 ↓ | 1 | 1 | 1 | 0 | 1 |
| 3 ↓ | 1 | 1 | 1 | 0 | 0 |
| 4 ↓ | 1 | 1 | 0 | 1 | 1 |
| 5 ↓ | 1 | 1 | 0 | 1 | 0 |
| 6 ↓ | 1 | 1 | 0 | 0 | 1 |

TABLE 14-continued

DATA BUS ASSIGNMENTS
CU → TU

| CU STATE | DATA BUS+ | | | | |
|---|---|---|---|---|---|
| | 5 | 4 | 3 | 2 | 1 |
| 7 ↓ | 1 | 1 | 0 | 0 | 0 |
| 8 ↓ | 1 | 0 | 1 | 1 | 1 |
| 9 ↓ | 1 | 0 | 1 | 1 | 0 |
| 0 ↓ | 1 | 0 | 1 | 0 | 1 |
| * ↓ | 1 | 0 | 1 | 0 | 0 |
| # ↓ | 1 | 0 | 0 | 1 | 1 |
| SEND ↓ | 1 | 0 | 0 | 1 | 0 |
| END ↓ | 1 | 0 | 0 | 0 | 1 |
| LOCK SWITCH OPERATED | 1 | 0 | 0 | 0 | 0 |
| HORN-ALERT SWITCH OPERATED | 0 | 1 | 1 | 1 | 1 |
| CLEAR KEY DEPRESSED | 0 | 1 | 1 | 1 | 0 |
| STORE ↓ | 0 | 1 | 1 | 0 | 1 |
| RECALL ↓ | 0 | 1 | 1 | 0 | 0 |
| OPTIONAL LOCAL FUNCTION WITH FEEDBACK TONE | 0 | 1 | 0 | 1 | 1 |

+1 = HIGH STATE, 0 = LOW STATE

Table 14 lists the data bus assignments as those assignments are transferred from the controller board or the circuitry of FIG. 2 other than cellular transceiver 22, while Table 15 below illustrates the data bus assignments provided by the transceiver to the controller board.

TABLE 15

DATA BUS ASSIGNMENTS

TU → CU

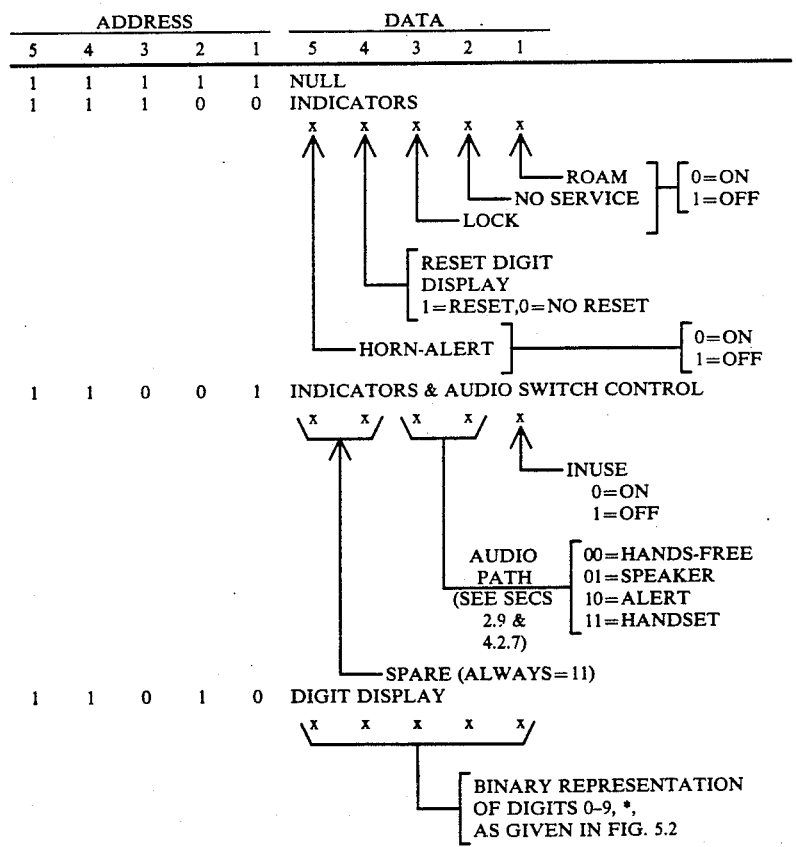

Figure 3:
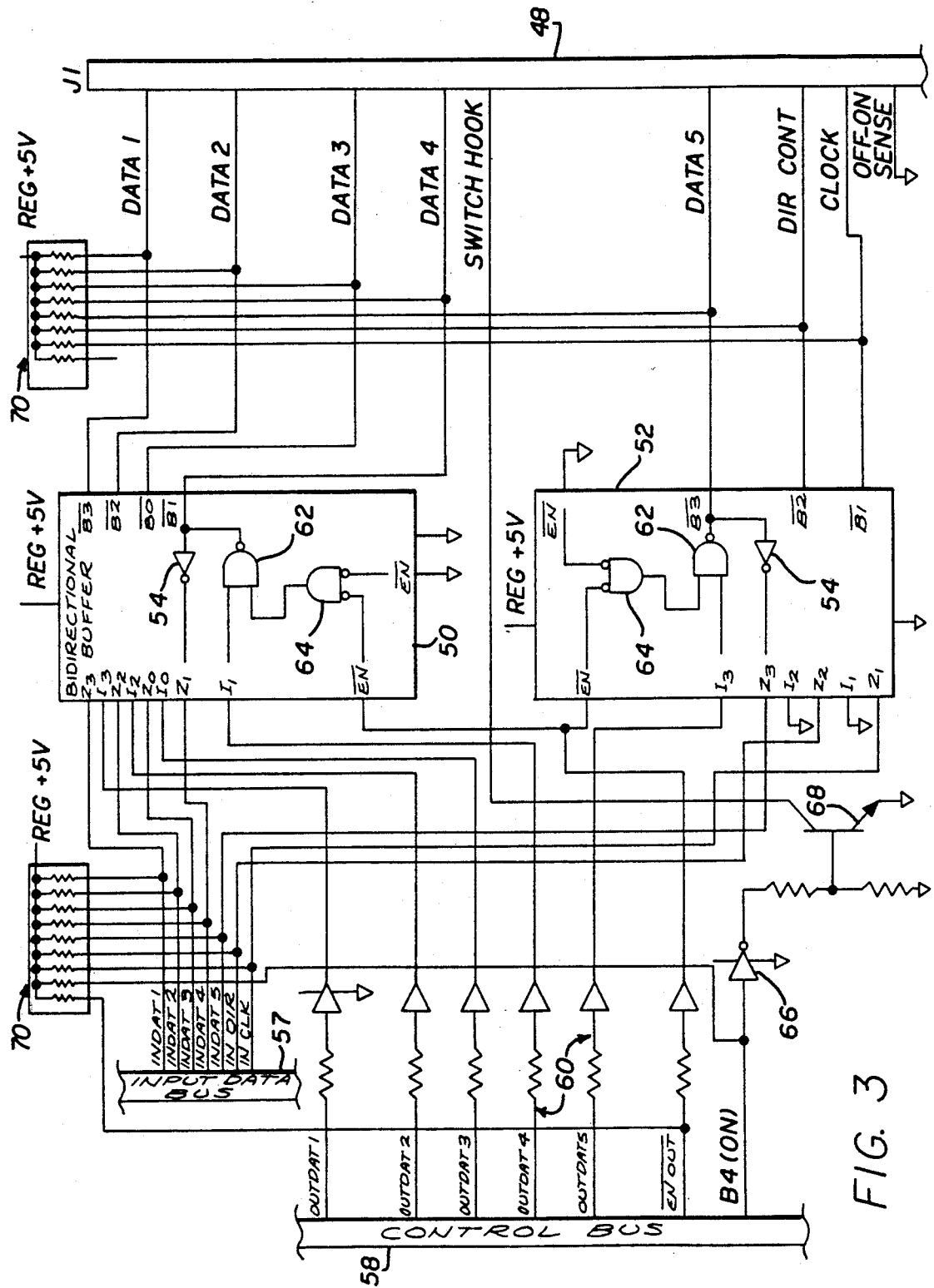
FIG. 3 is a schematic diagram of the portion of the circuitry of FIG. 2 included in buffer 32 of FIG. 2.

Data to and from transceiver 22 is handled in buffer 32 of FIG. 2 which is shown in greater schematic detail in FIG. 3. In the illustrated embodiment, buffer 32 includes two bidirectional buffers 50 and 52. Bidirectional buffers 50 and 52 include logic circuitry as schematically depicted for one set of inputs, I, B and outputs Z,B, for each buffer 50 and 52. Thus, signals appearing from transceiver 22 on bus 48 in FIG. 3 are generally coupled to the input of an inverter 54 within buffers 50 and 52 and thence to an input data bus 57. For example, data 4 on bus 48 is coupled through inverter 54 to the signal INDAT 4 on input data bus 57. Input data bus 57 has the five input data signals INDAT1-5 and a direction control signal IN DIR derived from DIR CONT, direction control from data bus 48 and the clock signal, IN CLK similarly derived from the signal, CLOCK, from bus 48.

Transceiver 22 thus makes the direction control line DIR CONT high when data is being sent to the controller board. Transceiver 22 changes its latched outputs using the following sequence of operations:

1. Change direction control line DIR CONT, to high and ensure clock line, CLOCK, is high.
2. Wait at least 4 milliseconds.
3. Place correct address on data bus.
4. Wait at least another 4 milliseconds.
5. Change clock line, CLOCK, to low, thereby signaling controler board to strobe address from the data bus, here input data bus 57.
6. Wait at least another 4 milliseconds.
7. Place correct data information on data bus 48.
8. Wait at least another 4 milliseconds.
9. Change clock line, CLOCK, to high, thereby signaling controller board to strobe data information from the data bus, again input data bus 57.
10. Wait at least another 4 milliseconds.
11. Place null address "11111" on data bus 48.
12. Wait at least another 4 milliseconds.
13. Change clock line, CLOCK, to low, thereby signaling controller board to strobe the no-action address from data bus 56.
14. Wait at least another 4 milliseconds.
15. Change direction line, DIR CONT, to low and clock line, CLOCK, to high.

Thus by this protocol information is supplied from transceiver 22 to input data bus 57 through buffers 50 and 52.

Similarly, information appearing on control bus 58 as depicted in FIG. 3, which information as will be discussed below as being generated from microprocessor 26, is coupled through a set of buffers collectively denoted by reference numeral 60 and appear as the signals OUTDAT1-5 and inverted enable out, EN OUT. Each of these signals are then coupled to a corresponding I input in bidirectional buffers 50 and 52.

As best depicted in the logic schematic which appears in buffer 50 and 52, each input, I, is connected to a nandgate 62. The other input of nandgate 62 is coupled to the output of an enabling andgate 64. Thus, when buffer 50 is enabled by en out, the output of nandgate 62 goes active low then when, for example in the illustration of FIG. 3, outdat 4 goes low. The output of nandgate 62 is then coupled to corresponding output, B, of buffer 50 and 52 and appears as a data signal, DATA1-5 on bus 48. Simultaneously, the information is fedback through corresponding inverters 54 to input data bus 57 as described above.

Also on control bus 58 is a signal B4(on) which corresponds to the switch hook signal on bus 48. B4 (on) is coupled through a buffer 66 to drive a biased transistor 68 whose emitter to collector circuit provides the active low signal, switch hook, for bus 48 as shown in FIG. 3.

Each of the signals B4(on), INDAT1-5, IN DIR, IN CLK, DATA1-5, DIR CONT, and CLOCK are each appropriately pulled high through pull-up resistors 70 unless otherwise driven to a different logic state.

However, in addition to digital information which may be bidirectionally communicated between cellular transceiver 22 and the controller board, audio information including DTMF tones, call processing and voice communication is similarly coupled between transceiver 22 and the controller board. Turn now to FIG. 4 wherein a portion of the audio circuitry is described corresponding to audio buffer 34 of FIG. 2.

The audio signal received from transceiver 22, is a differential pair of signals, RX AUD+ and RX AUD−. These signals are capacitively coupled to a differential amplifier 72 whose output is the signal denoted as received audio. Received audio is then coupled from differential amplifier 72 to a junction strip, J3. The same junction strip, J3, provides a terminal for the transmitted audio signal from transceiver 22 TX AUDIO. TX AUDIO is similarly capacitively coupled to a differential amplifier 74 and compared against a reference signal V REF. The output of differential amplifier 74 is capacitively coupled to form the output signal TX AUDIO+ and then further inverted by differential amplifier 76 to generate TX AUDIO−. TXAUDIO+ and TXAUDIO− collectively form the signal TX AUDIO which is coupled to the radio circuitry of cellular transceiver 22 for transmission.

RECEIVED AUDIO is also coupled to an audio amplifier, generally denoted by reference numeral 78, which produces the signals REC+ and REC− coupled to junction strips J2 and J3, which in turn is coupled to the handset ear piece or hands free speaker phone.

Figure 4:
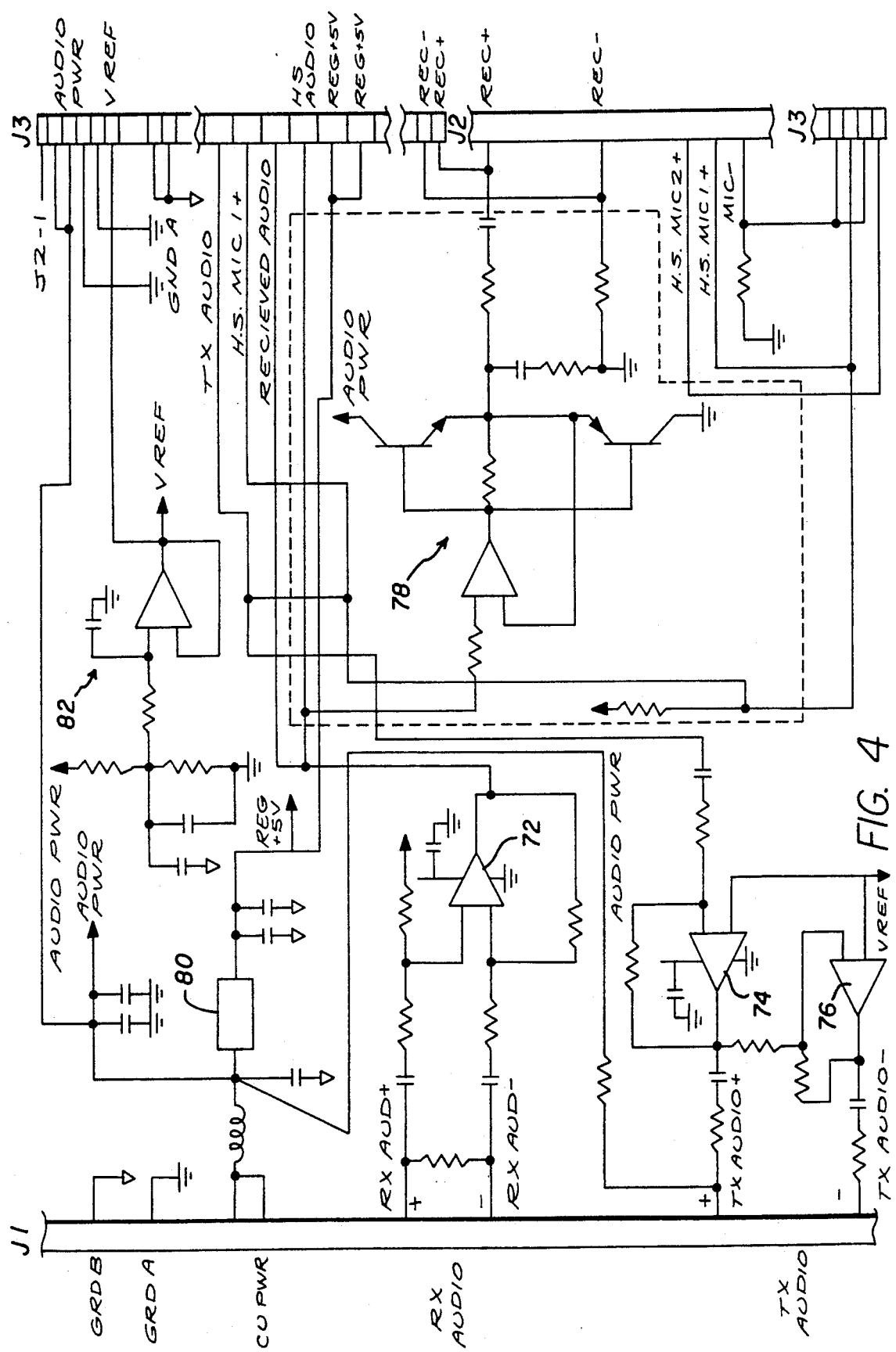
FIG. 4 is a schematic diagram of the portion of the circuitry of FIG. 2 included in audio buffer 34 of FIG. 2.

FIG. 4 also illustrates as originating on junction strip, J1, a switched controller board power, CU PWR. A conventional modular voltage regulating unit 80 provides a switched +5 volts power which is provided throughout the circuit and in particular to junction strip J3. In addition thereto, a voltage regulator circuit, generally denoted by reference numeral 82 provides the adjusted 6 volt, 1 milliamp V REF signal which is also utilized as appropriate throughout the circuit, such as in the TX AUDIO circuits 74 and 76.

However, in addition to the audio circuits being coupled between the handset 36 and cellular transceiver 22, the received audio signal is provided as the input to call processing circuitry 40, DTMF circuitry 38 and ENG detection circuitry 42 as shown and described in connection with FIG. 2.

Figure 5:
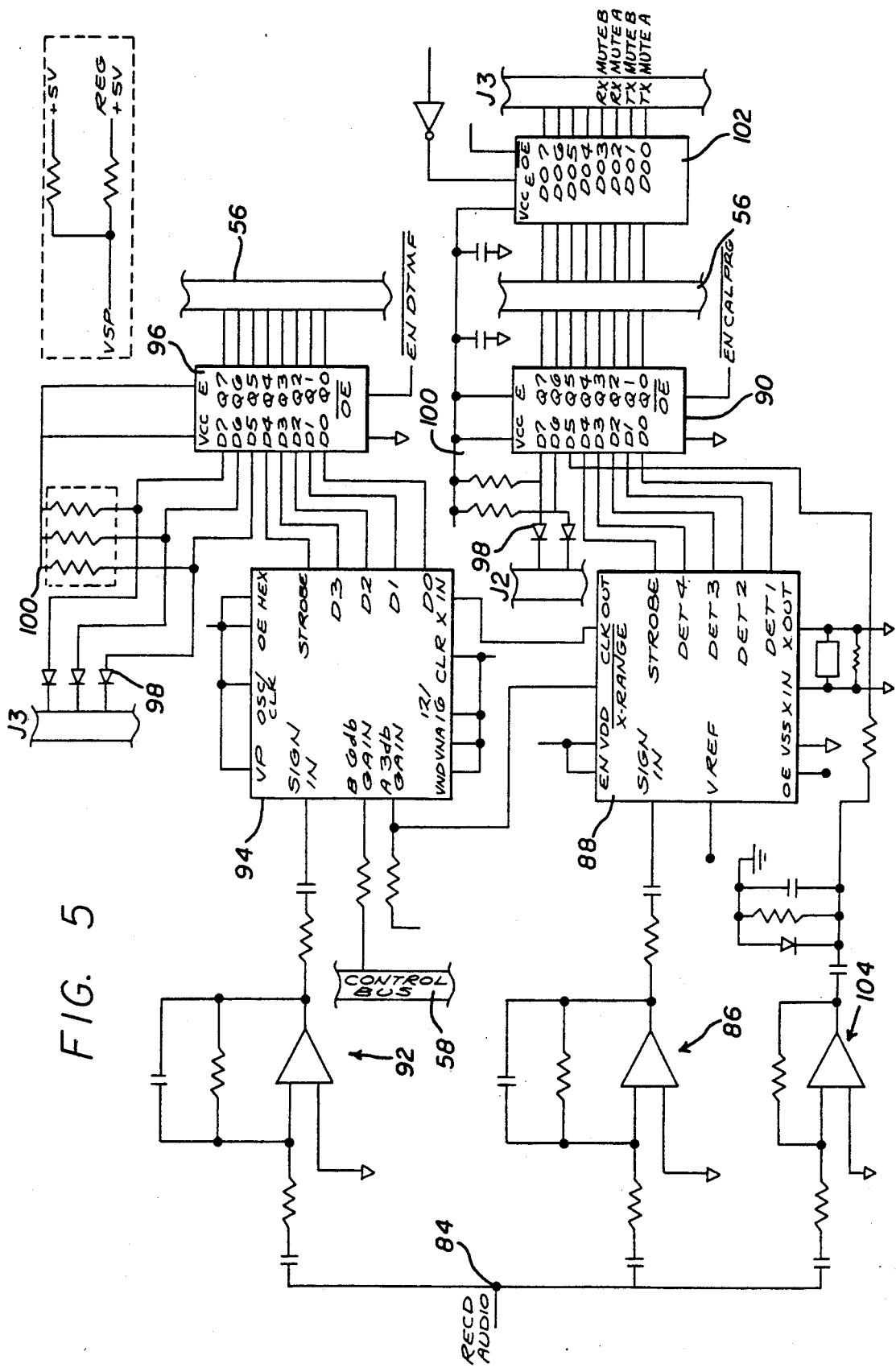
FIG. 5 is a schematic diagram of the portion of the circuitry of FIG. 2 included in DTMF decoder 38 and call processor 40 of FIG. 2.

Turn now to FIG. 5 wherein DTMF circuit 38 and call processing circuit 40 are shown in greater diagrammatic detail. The received audio signal is provided from audio circuit 34 of FIG. 2 to node 84 in FIG. 5. The audio signal, which is being received through the radio cellular network by transceiver 22 is then coupled through a buffer and signal conditioning circuitry, generally denoted by reference numeral 86, and capacitively input to modular call process detector, model M982 manufactured by Teltone. Call process detector 88 is an audio-to-digital decoder which is able to recognize the characteristic dual frequency tones transmitted to cellular transceiver 22 through the telephone network to produce an appropriate decoded word. For example, as shown in Table 16 below, the reorder, ringing, busy tone and dial tone provided by the telephone network are uniquely decoded through the four possible dual tones, namely DET1 at 350 hertz, DET2 at 620 hertz, DET3 at 440 hertz and DET4 at 480 hertz.

TABLE 16

| CALL PROGRESS DETECTOR | | | | |
|---|---|---|---|---|
| REORDER | RINGING | BUSY TONE | DIAL TONE | STROBE |
| 1 | 1 | 1 | 0 | DET 4 (430) |
| 0 | 1 | 0 | 1 | DET 3 (440) |
| 1 | 0 | 1 | 0 | DET 2 (620) |
| 0 | 0 | 0 | 1 | DET 1 (350) |

When a dial tone, a combination of DET3 and DET1, for example, is received module 88 will generate the word 0101. When a busy signal is received, the word 1010 is generated corresponding to the tones DET4 and DET2. The word decoded by call process detector 88 is strobed by call process detector 88 into buffer 90. The data within buffer 90 is then appropriately transferred to data bus 56.

Similarly, the received audio at node 84 is coupled through a buffer collectively denoted by reference numeral 92 and capacitively coupled into modular DTMF receiver, model M957 manufactured by Teltone. DTMF receiver 94 similarly decodes the audio DTMF signals which are in the received audio to generate a uniquely corresponding four bit digital word as summarized by Table 17 below.

TABLE 17

| DTMF RECEIVER M - 9572 | | | | | | | | | | | | | | | | |
|---|---|---|---|---|---|---|---|---|---|---|---|---|---|---|---|---|
| 1 | 2 | 3 | 4 | 5 | 6 | 7 | 8 | 9 | 0 | * | # | A | B | C | D | STROBE |
| 0 | 0 | 0 | 0 | 0 | 0 | 0 | 1 | 1 | 1 | 1 | 1 | 1 | 1 | 1 | 0 | D3 |
| 0 | 0 | 0 | 1 | 1 | 1 | 1 | 0 | 0 | 0 | 0 | 1 | 1 | 1 | 1 | 0 | D2 |
| 0 | 1 | 1 | 0 | 0 | 1 | 1 | 0 | 0 | 1 | 1 | 0 | 0 | 1 | 1 | 0 | D1 |
| 1 | 0 | 1 | 0 | 1 | 0 | 1 | 0 | 1 | 0 | 1 | 0 | 1 | 0 | 1 | 0 | D0 |

For example, the DTMF tones corresponding to the signals 1-9,0,*,#, and A-D correspond to the four bit binary words 001 through 1111 and 0000 respectively. The decoded words then are strobed from DTMF receiver 94 into a data buffer 96 and then clocked onto data bus 56.

Also clocked into data buffer 90 and 96 are the conditions of the inner door of the callbox, the condition of the handset speaker and handset microphone and the condition of an illumination lamp provided at the callbox. The condition of these units are provided by appropriate protection diodes 98 coupled to corresponding D inputs to buffers 90 and 96. Otherwise each of these input lines are pulled high by corresponding pull up resistor 100. For example, as long as the inner door has not been tampered with in the callbox, no ground is provided to the inner door terminal on junction strip J3, thus corresponding pull-up resistor 100 maintains the D7 input of data buffer 96 high. However, in the event that the inner door is tampered with, a switch or contact is made which will pull the input to D7 low. This status will then be appropriately clocked at a later time by the inverted clock signal, EN DTMF, onto data bus 56.

Similarly, in the event that the callbox does not use a handset, but instead a speaker phone, various analog gain and adjust signals for the speaker and microphone of the hands free unit may be similarly coupled through buffer 102 to data bus 56. In this case, an RX mute b, RX mute a, TX mute b, and TX mute a signals are coupled from junction strip J3 into appropriate input terminals on buffer 102 and clocked by an appropriate output enable signal onto the data bus 56 or vice versa.

The received audio signal at node 84 is also provided to an AC to DC (ENG) converter or peak to peak detector collectively denoted by reference numeral 104. The existence of any active signal in the received audio at node 84 is detected by detector circuit 104, which then produces a high output appropriately coupled to a corresponding D input of data buffer 90 and thus made available to data bus 56. In this way, microprocessor 26 can determine whether there is any activity or information present on the received audio signal at the callbox transceiver 22.

Figure 6:
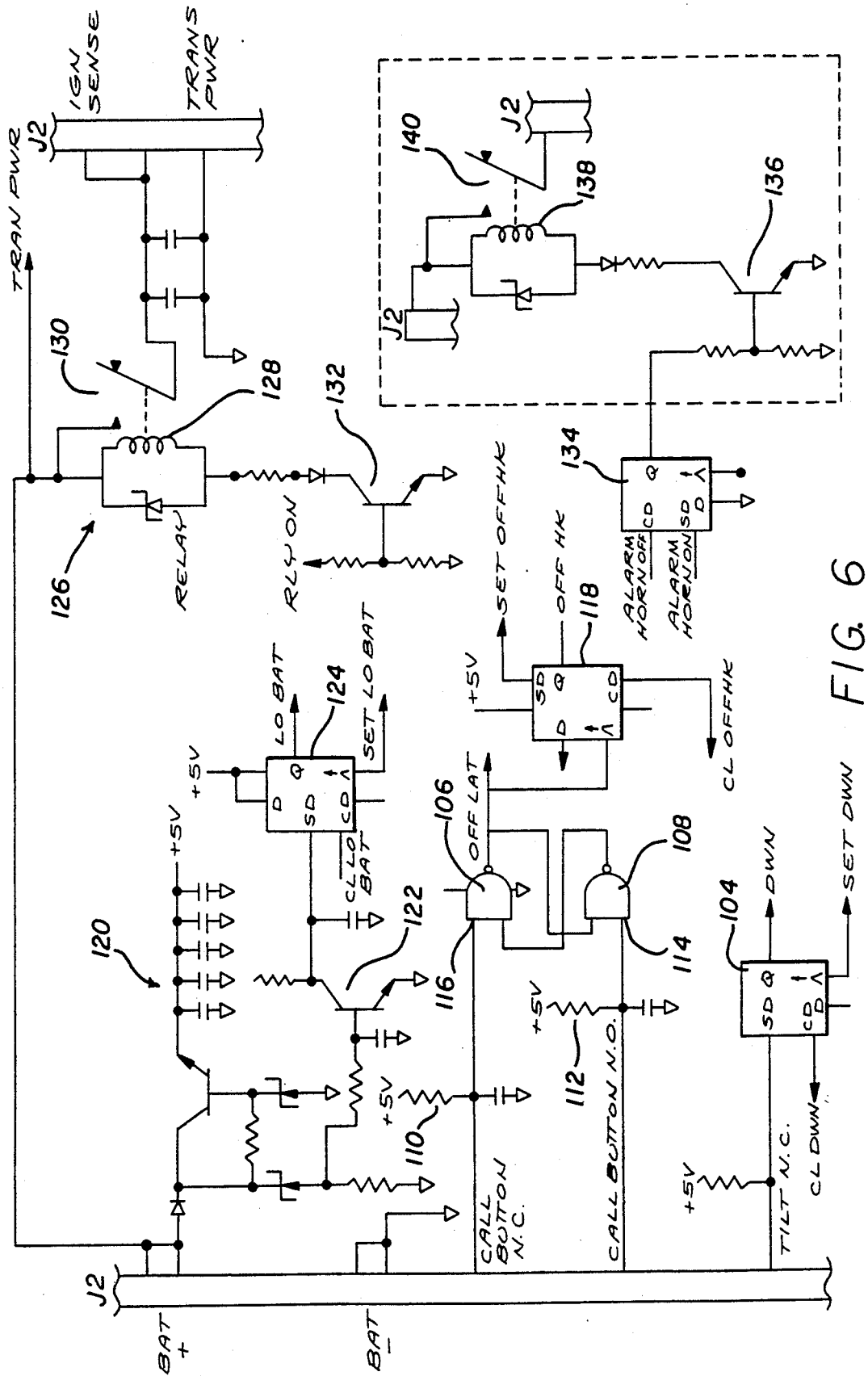
FIG. 6 is a schematic diagram of the portion of the circuitry of FIG. 2 included in buffer 46 of FIG. 2.

In addition to the outputs of buffer 32, DTMF circuit 38, call processor circuit 40, and detector 42, additional input signals may be coupled to microprocessor 26 through buffer 46 shown in FIG. 2. A portion of buffer circuitry 46 has already been described in connection with data buffers 90, 96 and 102. In addition thereto as shown in FIG. 6, a number of callbox sensors for sensing various conditions at the callbox can also be included.

For example, a tilt switch coupled to the tilt terminal of junction strip J2, as the signal, tilt NC, which is normally closed, is coupled to a flip-flop 104. The output flip-flop 104 is the interpreted as the pole-down signal, DWN, which can be reset by the signal, set DWN.

In the illustrated embodiment, the callbox has a call button which is pushed in order to activate the call. There is a normally closed call button signal, CALL BUTTON NC, and a normally open call button signal, CALL BUTTON NO, coupled to junction strip J2. Call button NC is coupled to one input of nandgate 106, while call button NO is coupled to one input of nandgate 108. When the button is not pushed, pull-up resistor 112 pulls input 114 of nandgate 108 high. At the same time call button NC has pulled input 116 of nandgate 106 low. Therefore the output of nandgate 106 is high. The output of nandgate 106 is coupled to the other input of nandgate 108. With both inputs of nandgate 108 high, its output is low. In the meantime, the output of nandgate 106, being high, is the signal off latch, OFF LAT. This circuit prevents key bounce.

When the button is pushed, call button NC opens and call button NO closes. Input 116 of nandgate 106 goes high and input 114 goes low. The output of nandgate 108 is thus always high regardless of its other input. The output of nandgate 108 is coupled to the other input of nandgate 106. The output of nandgate 106 thus now goes low indicating that the signal inverted OFF LAT is active low. inverted OFF LAT is used as the clock input for a flip flop 118. The Q output of flip flop 118, clocked by inverted OFF LAT, is a signal, off hook, OFFHK. Set OFFHK and CL OFFHK are the set and clear signals for flip flop 118.

Still further, junction strip J2 has the callbox battery terminals coupled to it. A voltage regulator circuit, generally denoted by reference numeral 120 provides a five volt voltage supply for the circuitry on the controller board and also provides through the circuitry which includes transistor 122, a low battery signal to flip flop 124. Q output of flip flop 122 is the signal low battery, LO BAT, indicative of a predetermined voltage drop across the terminals of the callbox battery.

Power to transceiver 22 is also provided through a relay circuit, generally denoted by reference numeral 126, which is comprised of a relay 128 which move relay contacts 130 through which the battery voltage is selectively coupled to junction strip J2. Alternatively power may be switched by means of power PMOSFETs. It must be appreciated that the 5 volt regulated power in the circuitry of the invention is switched by means of relay 128 by switching transceiver 22 which in turn switches CU POWER to the regulated 5 volt supply circuitry. Relay 128 is switched on and off by transistor 132 which in turn is controlled by a signal relay on, RLY ON, generated by microprocessor 26 as described below.

The callbox may also have a horn or siren located in the callbox in the event that it is tampered with or is otherwise desired to sound an alarm at the callbox. Microprocessor 26 also generates an alarm horn off and an alarm horn on signals as described below which are coupled to the inputs of flip flop 134. The Q output of flip flop 134 is used to control a transistor 136. Transistor 136 in turn provides the switch power to a relay 138 shown or PMOSFETs. Relay 138 controls relay contacts 140 which selectively apply a thirteen volt power supply to a terminal point on junction strip J2 from which an alarm or siren mounted at the callbox is connected. The alarm horn circuitry can also be used to turn off or on a lamp at the callbox site.

Figure 7:
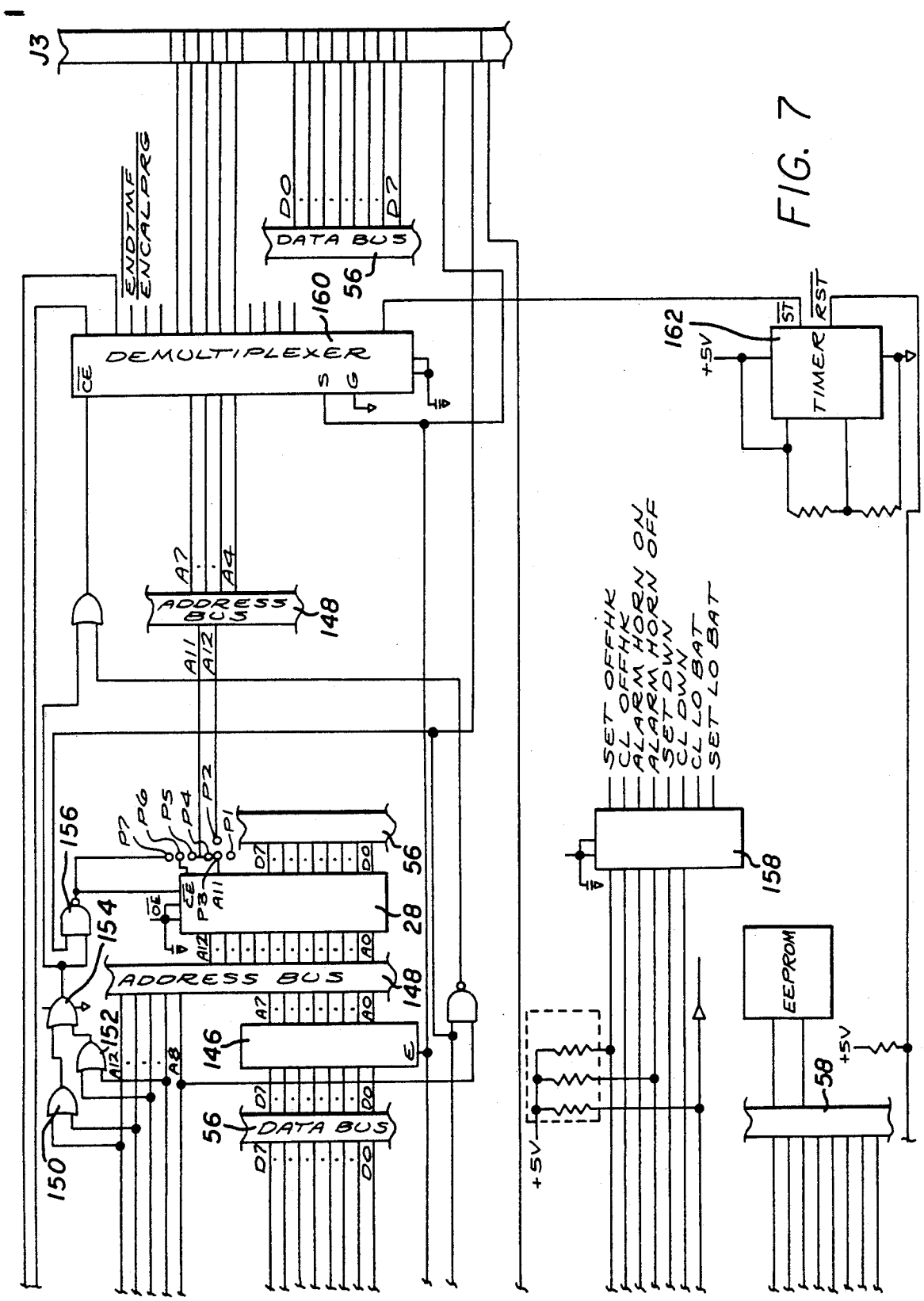
FIG. 7 is a schematic diagram of the portion of the circuitry of FIG. 2 included in microprocessor circuitry 26 of FIG. 2.

Turn now to FIG. 7 wherein memories 28 and 30, decoder 44 and microprocessor 26 of FIG. 2 are depicted in greater diagrammatic detail. In the illustrated embodiment microprocessor 26 is a model 146805 microprocessor manufactured by Motorola. Microprocessor 26 is controlled by an external crystal control clock 142 which runs at 242 KHz. The circuitry of FIG. 7 is similar in some respects to the circuitry described in FIG. 8 of Nasco, "Apparatus and Method for a Cellular Freeway Emergency Telephone Service," Ser. No. 801,480, which is herein reincorporated by reference. However, a portion of the circuitry as shown in FIG. 7 is distinct and will be separately described here in detail while the description of the common portion will be set forth briefly only for the purposes of completeness and ease of comprehension.

The program for microprocessor 26 is stored within an external EPROM memory 28. Memory 28 is accessed by microprocessor 26 through terminals B0-B7 and A8-A12 which provide a 13 bit address word. Terminals B0-B7 are used during the first half cycle of processor 26 as the lower eight bits of the address and during the second half cycle as a data input and output. Therefore, during the memory fetch, the lower eight bits of the address are coupled through data bus 56 to a bit latch 146 under the control of the address strobe signal, AS, from microprocessor 26. Thereafter, all 13 bits of the address are coupled to address bus 148. The address inputs, A0-A10 and A12 are coupled to address bus 148, and memory 28 is enabled by a combination of address bits A9-A12 on the address bus.

More specifically the A11 and A12 output terminals from microprocessor 26 are coupled to orgate 150 while address terminals A9 and A10 are coupled to the inputs of orgate 152. The outputs of orgate 150 and 152 in turn are coupled to the inputs of orgate 154.

The output of orgate 154 is coupled to one input of nandgate 156. The other input of nandgate 156 is derived from the data strobe signal, DS, from microprocessor 26. Thus, during an address cycle if any one of the addresses A9-A12 is high, this value is coupled to the inverted output enable, OE, and to node P-6 in a jumper pad. In this same jumper pad, nodes P-4 and P-5 are coupled to address A11 from address bus 148; node P-2 is coupled to address A12 from address bus 148; node P-1 to the five volts supply; node P-3 is coupled to the address A11 input of memory 28; and P-6 to the inverted chip enable, CE, input of memory 28.

Therefore, depending of the size eprom installed as memory 28, appropriate jumper connections can be made among nodes P1-P7 to appropriately configure the memory space. Table 18 below summarizes the jumper connections which can be made for a 2, 4, and 8 k memory.

TABLE 18

| | | EPROMS | | |
|---|---|---|---|---|
| P2-P3 | P1-P3 | P3-P4 | P5-P6 | P6-P7 |
| | IN | | | IN |
| | | IN | | IN |
| IN | | | IN | |

At any rate, memory 28 is appropriately strobed and stored information is read from outputs D0-D7 onto database 56. Therefore, data and programming information stored within a EPROM 28 is read on a read cycle into microprocessor 26.

Outputs PA0-PA7 are input/output ports of microprocessor 26 which in the present embodiment are used only as output terminals which are selectively accessed through program control. PA5-PA7 and PB5-PB7 are coupled to the inputs of a decoder 158. The signals of the outputs PA5-PA7 correspond respectively to two encoded bits designated as A0A and A1A and an inverted enable signal, EA. Similarly, output signals PB5-PB7 correspond respectively to encoded bits A0B and A1B together with an inverted enable signal, EB. These input bits within decoder 158 and their respective enable signals are coded according to conventional means into a plurality of control signals which have been discussed and shown in connection with circuitry of the prior figures. These signals include for example, set OFFHK, CL OFFHK, alarm horn on, alarm horn off, set DWN, CL DWN, CL LO BAT, and set LO BAT. Thus the various status signals can be clocked, cleared or set at appropriate times by software control of microprocessor 26 by which the status of the callbox can be queried and configured.

Outputs PA0-PA4 are coupled to control bus 58 described in connection with FIG. 3 by which digital signals are transmitted to transceiver 22.

Additional ones of the outputs ports of microprocessor 26 provide specific control signals. Such as PB1 when inverted is the signal PWR on, which switches on power to transceiver 22. The output PB3 is coupled directly to the DTMF gain input of module 94 of FIG. 5 to allow for program control of DTMF decoding.

Also coupled to address base 148 is a decoder 160 driven by address bits A4-A7 for generating a plurality of enabling signals used throughout the circuits such as inverted ENDTMF and inverted ENCALPRG used as the active low output enable signals for buffers 90 and 96 described in FIG. 5 above. A watch dog time signal is provided at output 100 of decoder 160 every 20 msec to watch dog timer 162 whose inverted output RST is coupled to the active low reset terminal of microprocessor 26. If after a predetermined time interval, e.g. 1 second, a pulse is not received by timer 162, a master reset signal will be generated and all circuitry will be reset and restarted.

A portion of decoder 44 in FIG. 2 includes, for example, buffer 164 shown in FIG. 7. The data inputs to buffer 164 include such specific sensing signals as OFFHK, DWN, LO BAT, OFF LAT. Buffer 164 is strobed by a low output enable signal, OE, derived from decoder 160 and strobed at the appropriate time onto data bus 56. Similarly, the input data bus 57 described in FIG. 3, which received digital signals from the transceiver 22, are input into buffer 166 which also enabled by a low output inverted enable signal, OE, derived from one of the outputs with decoder 160. The digital signals from transceiver 22 are then clocked from buffer 166 as appropriate under the control of microprocessor 26 through decoder 160 onto data bus 56.

Certain ones of the data inputs of buffer 164, namely D0–D4, are normally pulled high through corresponding pull-up resistors, or can be accessed through selected terminals on junction strips J2 and J3 for on-site data input and testing.

The circuitry now having been described, consider the operation of the callbox apparatus as implemented in the circuitry of FIGS. 2–7. As shown in the flow chart of FIG. 8, operation begins at step 200 with all the variables being initialized at step 202, such as the various status sensing circuits and flip-flops. Microprocessor 26 first interrogates whether or not the call button has been pushed at step 204, this includes testing the off latch signal such as generated and described in FIG. 6 through buffer 164 as described in FIG. 7. If the button has been pushed, power is switched on to the cellular transceiver by causing PB1, PWR on, to go active, thereby setting a relay within transceiver 22 (not shown), starting the service routine and software timer. If the button has not been pushed as determined in step 204, the existence of alarms, the occurrence of a preprogrammed reporting time, or the necessity to make an alarm call is checked at step 208. If any of these events occur, the sequence diverts to step 206, otherwise, a determination is made in step 210 whether or not the call, having been already made, has been previously put on hold. If a call is on hold, a hold time-out is checked at step 212. If the time-out for the hold has expired, a power down and clear-hold sequence is implemented in step 214. If the hold time-out has not expired, the determination is then made at step 216 whether or not a ring is being received by transceiver 22. If a ring is being received by the cellular transceiver, an answer routine is implemented in step 218. Otherwise, the protocol returns to step 204. Similarly, if the call is not on hold as determined at step 210, the method returns to step 204.

If a call is to be made from the callbox, following the power-up sequence at step 206, a determination is made at step 220 whether or not cellular access has been granted to and acknowledged by transceiver 22. If not, a 30-second time-out is checked at step 222. If the time-out has not occurred within 30 seconds, the method returns to step 220, otherwise, a try counter within scratch memory or a register in microprocessor 26 is set at a predetermined count, such as at five at step 224.

Figure 8A:
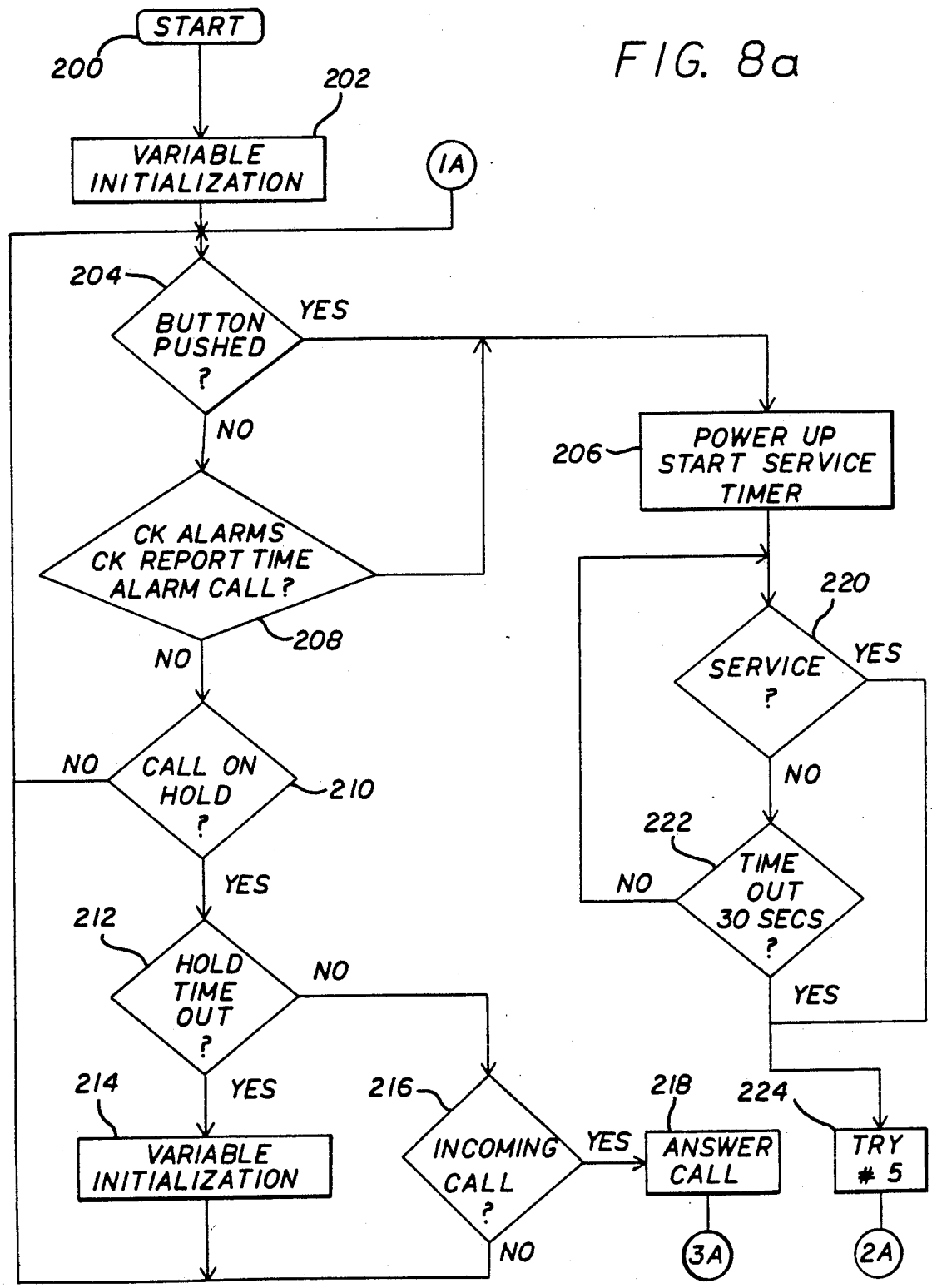
FIGS. 8a–d are flowcharts of the operational sequences of the circuitry of FIGS. 1–7.
Figure 8B:
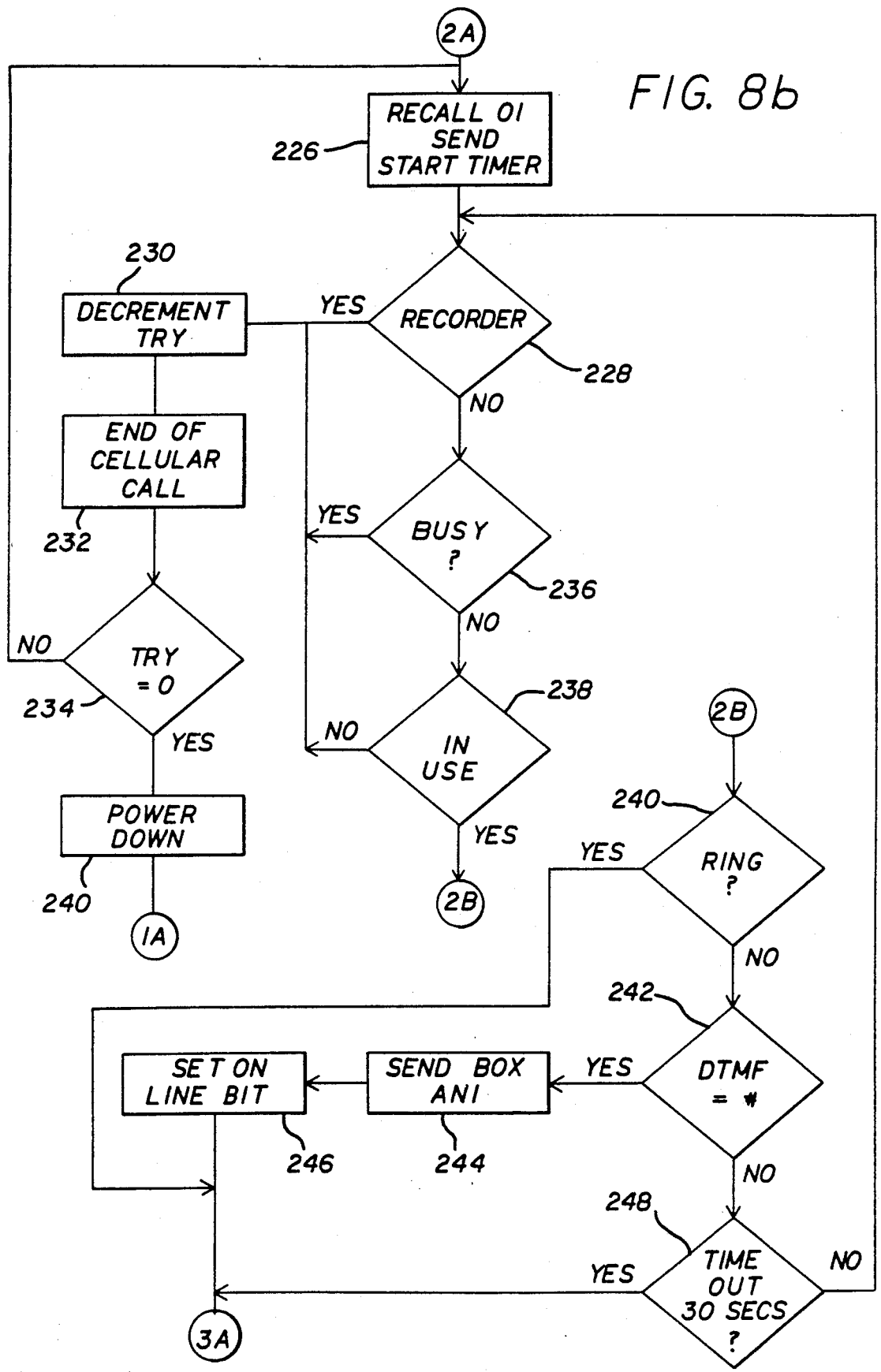

As shown in flow chart of FIG. 8b, at step 226 the number at memory location 1 in transceiver 22 is autodialed, the send signal communicated to transceiver 22, and a timer is started. At this point microprocessor 26 begins call processing. The tone received by transceiver 22 is first checked at step 228 to determine if a reorder tone is being received, indicating some type of malfunction, e.g. insufficient number of digits dialed or invalid digits dialed. If such a reorder tone is received, the try counter is decremented at step 230, and the cellular telephone call terminated at step 232. If the number of tries have not yet reached zero as determined at step 234, the method returns to step 226 to retry the call. If however, there is no re-order tone received by cellular transceiver 22, then at step 236, the determination is made whether or not the landline telephone system indicates a busy tone. If there is a busy tone received by the transceiver, the try counter is again decremented at step 230, the cellular call terminated at step 232, the number of tries tested at step 234, and the sequence returns to resend the call.

Next, a determination is made at step 238 whether an in-use signal, indicating that the cell site is not available or that the call has been dropped. In either case the methodology continues with the sequence at step 230 by decrementing the try counter, terminating the cellular call at step 232, and then testing the contents of the try counter 234. If on any one of these occasions at step 234 discussed above, the try counter has been decremented to zero, the entire system powers down as implemented in step 240. At this point the methodology of the system again returns to step 204 of FIG. 8a to determine whether or not the button has been repushed to restart the call sequence.

If the telephone network otherwise appears clear as finally determined at step 238, a determination is made at step 240 whether or not the called phone is ringing as heard through transceiver 22. If the called phone is not ringing, then a determination is made in step 242 whether or not a DTMF tone for "#" is being received from the called station or computer. If the # sign has been received, it is interpreted as an indication from the highway patrol or maintenance computer that the ANI of the callbox is being requested. This ANI is then sent from the callbox at step 244, followed by setting the on-line bit at step 246.

If the phone is not ringing, and there is no request for the ANI, then a test is made at step 248 to determine whether a 30-second time-out has expired. If not, the methodology returns to the call processing sequence beginning at step 228. Otherwise, the methodology proceeds with the phone call as described in connection with FIG. 8c.

If a ring has been received, or the ANI sent by the callbox before the time-out reached, a call timer will be started at step 226, typically for 10 minutes thereby limiting the duration of the call. Normally, a ring count will be set to 10 at step 252 and then a determination made at step 254 to determine whether a DTMF tone for "0" is being received from the highway patrol or maintenance computer, which is indicative of a call termination command. If no such termination command has been received, then the test is made at step 256 to determine whether or not the ANI is being requested by the existence of a DTMF tone for the # sign. If this tone occurs at this time, the callbox ANI is transmitted at step 258 and the on-line bit set at step 260 with methodology returning to step 254 to determine whether or not a call termination command is being received.

If at it step 256 is determined that there is no request for the ANI, then a determination is made at step 258 whether the cell site is available for transmission. If the cell site is not available for transmission, a cellular error counter is incremented at step 260, the cellular call terminated at step 262 and hold is set and a hold timer started at step 264. Thereafter, processing returns to the beginning of step 204 depicted in FIG. 8a, in which the callbox is waiting for the call button to be pushed. If, however, connection through the cell site controller is possible, a determination is next made at step 266 to determine if the DTMF tone for "7" is being received which is an instruction from the highway patrol or central computer station asking for the callbox to be put on hold. If such an instruction is being received, the process terminates the call at step 262 as previously described. However, if no such hold instruction is being received, the determination is next made at step 268 whether a DTMF tone for "1" has been received, which would cause an increment of the call timer to be increased from 10 minutes to 20 minutes as implemented in step 270. However, if no such incrementation is being received from the highway patrol or maintenance computer, communication continues as described at FIG. 8d.

A determination is then made at step 270 whether the call timer has expired. If it has, the call is terminated at step 273 and cellular transceiver 22 is powered down at step 274. Processing then returns to wait for the callbox button to be pushed. If however, the call time-out has not expired, the determination is then made at step 272 whether or not communication has been established. If there is no communication established by transceiver 22 as determined by setting of the on-line bit flag at steps 260 or 246, the determination is then made in step 274 whether or not the ring time-out has expired. If the ring time-out has not expired, a determination is then made in step 276 whether or not there is a ring tone on the line. If a ring tone is on the line, the ring count is decremented in step 278 with a test of the ring count being made in step 280. If the ring count has not yet reached zero, the ring time out is set at step 282 and the communication continues to the call processing sequence beginning step 254 as described in FIG. 8c.

Figure 8C:
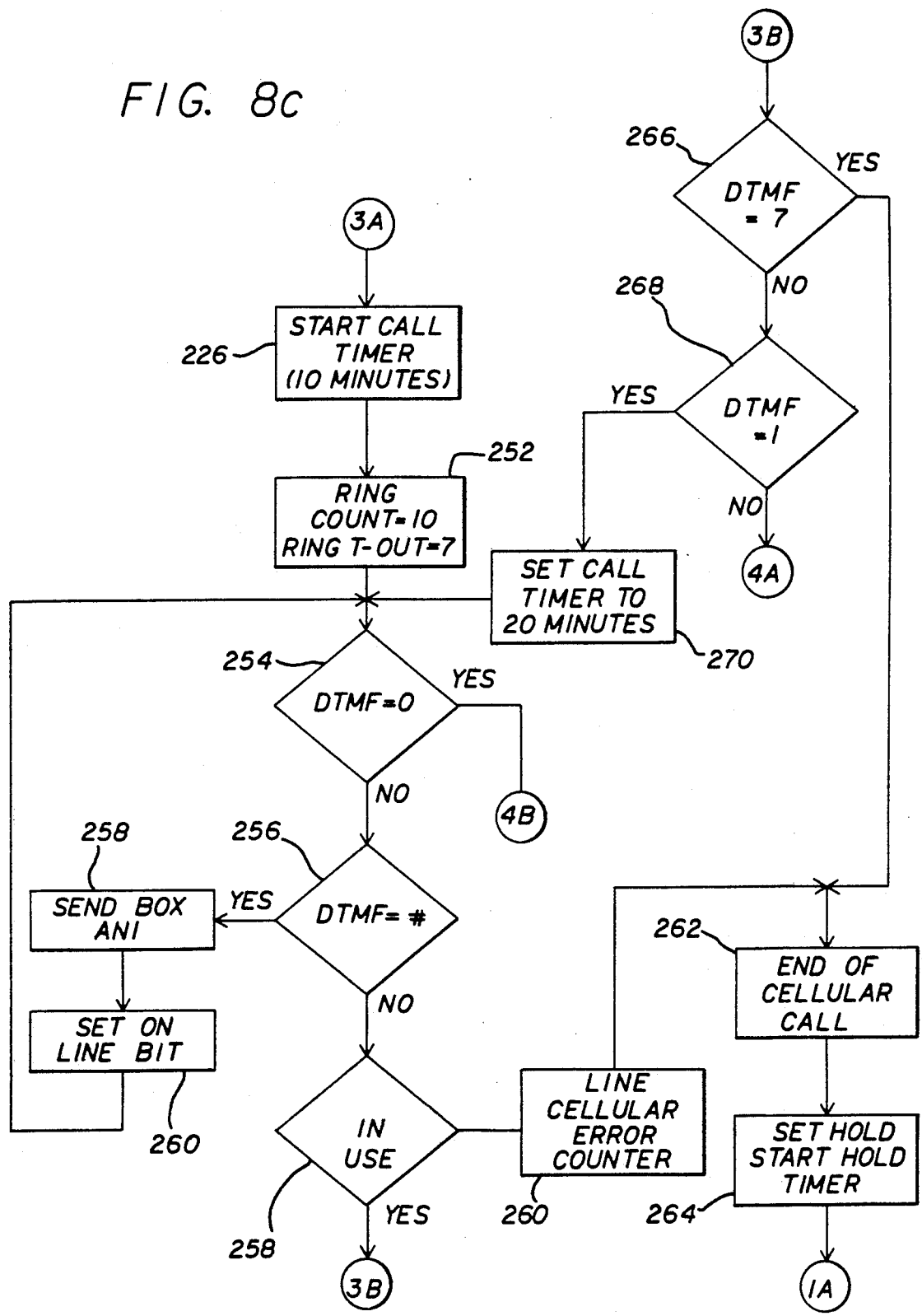
Figure 8D:
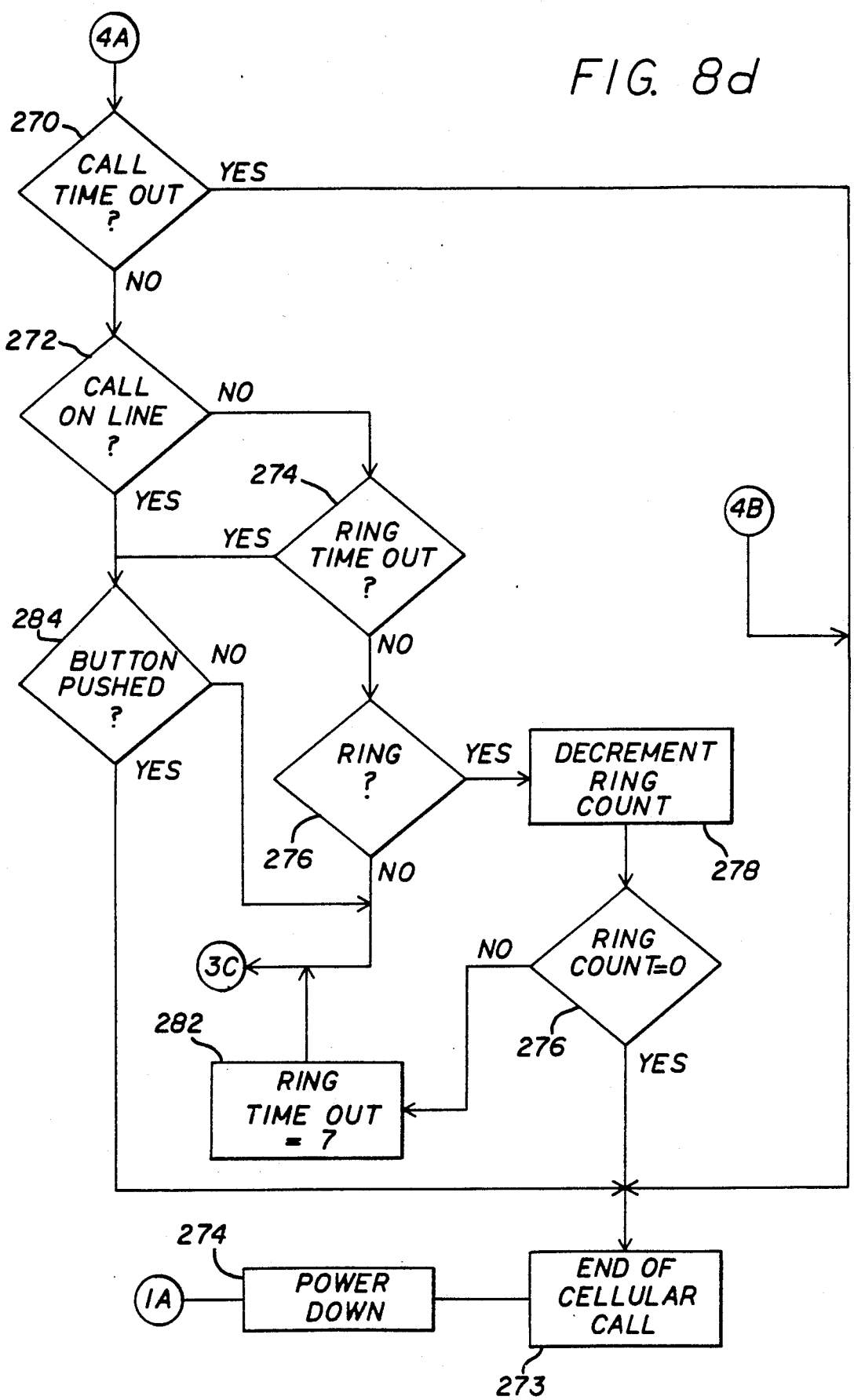

Similarly, if at step 276 there is no ring present at the line, processing again returns to the call processing sequence beginning step 254 in FIG. 8c. If, however, at step 274 the ring time-out has expired, an inquiry is made at step 284 whether or not the call button has been pushed. If the call button has not been pushed, processing will again return to the call processing sequence beginning step 254 FIG. 8c. Otherwise, the call is terminated at step 272 as described above.

Many modifications and alterations may be made by those having ordinary skill in the art without departing from the spirit and scope in the invention. Therefore, it must be expressly understood that the present invention has been shown only for the purposes of illustration and should not be taken as limiting this invention as defined in the following claims:

I claim:

1. In an emergency call box system using cellular telephone technology, the combination comprising:
 a plurality of fixed location call box means, each of which comprises:
  cellular transceiver means for transmitting and receiving data signals and/or voice signals,
  programmable means for controlling the operation of the cellular transceiver means according to a program having a plurality of parameters which govern the timing and sequence of steps performed by the call box means;
 remotely located communication processor means including:
  means for storing a plurality of call box personalities as preselected sets of values for the parameters of said program, each set of values corresponding to a different characteristic manner of call box operation;
  means for assigning each of said sets of values to a plurality of the call box means to create a group of call box means for operation according to each personality;
  means for generating audio-frequency data signals for transmission to the call box means of one of said groups to cause each of said call box means to operate according to the personality of the group; and,
 a cellular system mobile telephone switching means for passing said data signals and said voice signals between the cellular transceiver means and the remotely located communication processor means.

2. In an emergency call box system using cellular telephone technology, the combination comprising:
 a plurality of fixed location call box means, each of which comprises:
  cellular transceiver means for transmitting and receiving data signals and/or voice signals,
  alphanumeric display means for communicating visually with a user of the call box means,
  programmable means for controlling the cellular transceiver means according to a program having a plurality of parameters to place an emergency call by dialing at least one stored telephone number in response to a user input, said parameters governing the timing and sequence of steps performed by the call box means,
  the programmable means comprising:
   means for decoding remotely originated audio-frequency data signals of different types,
   means acting in response to decoding of a first type of said audio-frequency data signals to change the stored telephone number, and
   means acting in response to decoding of a second type of said audio-frequency data signals for causing selected messages to appear on the display means;
 a remotely located communication processor means comprising:
  means for producing audio-frequency data signals of said first and second types to selectively redirect communications from the call box and cause information to appear on the display means;
  means for storing a plurality of call box personalities as preselected sets of values for the parameters of said program, each set of values corresponding to a different characteristic manner of call box operation;
  means for assigning each of said sets of values to a plurality of the call box means to create a group of call box means for operation according to each personality;

means for generating audio-frequency data signals of a third type for transmission to the call box means of one of said groups to cause each of said call box means to operate according to the personality of the group; and, a cellular system mobile telephone switching means for passing said data signals and said voice signals between each of the cellular transceiver means and the remotely located communication processor means.

* * * * *